US011625932B2

(12) United States Patent
Ampanavos et al.

(10) Patent No.: US 11,625,932 B2
(45) Date of Patent: Apr. 11, 2023

(54) ORGANIZING AND REPRESENTING A COLLECTION OF FONTS ACCORDING TO VISUAL SIMILARITY UTILIZING MACHINE LEARNING

(71) Applicant: Adobe Inc., San Jose, CA (US)

(72) Inventors: Spyridon Ampanavos, Somerville, MA (US); Paul Asente, Redwood City, CA (US); Jose Ignacio Echevarria Vallespi, South San Francisco, CA (US); Zhaowen Wang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 179 days.

(21) Appl. No.: 17/007,790

(22) Filed: Aug. 31, 2020

(65) Prior Publication Data
US 2022/0067461 A1 Mar. 3, 2022

(51) Int. Cl.
G06F 17/00 (2019.01)
G06V 30/244 (2022.01)
G06N 3/04 (2023.01)
G06F 40/109 (2020.01)
G06F 3/0482 (2013.01)
G06N 3/08 (2023.01)
G06V 10/40 (2022.01)
G06V 10/75 (2022.01)
(Continued)

(52) U.S. Cl.
CPC .......... *G06V 30/245* (2022.01); *G06F 3/0482* (2013.01); *G06F 18/2137* (2023.01); *G06F 18/22* (2023.01); *G06F 40/109* (2020.01); *G06N 3/04* (2013.01); *G06N 3/08* (2013.01); *G06V 10/40* (2022.01); *G06V 10/751* (2022.01)

(58) Field of Classification Search
CPC .... G06V 30/245; G06V 10/751; G06V 10/40; G06F 40/109; G06F 3/0482; G06F 18/22; G06F 18/2137; G06K 9/6215; G06K 9/6251; G06N 3/04; G06N 3/08
USPC .................................................. 715/269, 200
See application file for complete search history.

(56) References Cited

U.S. PATENT DOCUMENTS 9,501,724 B1 * 11/2016 Yang ..................... G06V 30/245
9,824,304 B2 * 11/2017 Wang ..................... G06K 9/627
(Continued)

FOREIGN PATENT DOCUMENTS

WO WO-2005006249 A1 * 1/2005 ........... G06K 9/6251

OTHER PUBLICATIONS

Hamid et al, A Modified Self-Organizing Map Neutral Network to Recognize Multi-font Printed Persian Numerals, published Nov. 2017 via International Journal of Engineering, pp. 1-8 (pdf).*

(Continued)

*Primary Examiner* — Manglesh M Patel
(74) *Attorney, Agent, or Firm* — Keller Preece PLLC

(57) ABSTRACT

Utilizing a visual-feature-classification model to generate font maps that efficiently and accurately organize fonts based on visual similarities. For example, extracting features from fonts of varying styles and utilize a self-organizing map (or other visual-feature-classification model) to map extracted font features to positions within font maps. Further, magnifying areas of font maps by mapping some fonts within a bounded area to positions within a higher-resolution font map. Additionally, navigating the font map to identify visually similar fonts (e.g., fonts within a threshold similarity).

20 Claims, 14 Drawing Sheets

(51) Int. Cl.
  *G06F 18/22* (2023.01)
  *G06F 18/2137* (2023.01)

(56) References Cited

U.S. PATENT DOCUMENTS

| | | | | |
|---|---|---|---|---|
| 10,515,296 | B2* | 12/2019 | Liu | G06V 30/245 |
| 10,528,649 | B2* | 1/2020 | Wang | G06F 40/109 |
| 2011/0276872 | A1* | 11/2011 | Kataria | G06F 40/109 |
| | | | | 715/764 |
| 2014/0136957 | A1* | 5/2014 | Kaasila | G06F 40/109 |
| | | | | 715/235 |
| 2017/0061257 | A1* | 3/2017 | Yang | G06K 9/6219 |
| 2017/0098138 | A1* | 4/2017 | Wang | G06V 30/245 |
| 2017/0098140 | A1* | 4/2017 | Wang | G06V 30/245 |
| 2018/0089151 | A1* | 3/2018 | Wang | G06V 30/226 |
| 2019/0108203 | A1* | 4/2019 | Wang | G06V 10/82 |
| 2019/0130231 | A1* | 5/2019 | Liu | G06N 3/084 |
| 2019/0138860 | A1* | 5/2019 | Liu | G06N 3/0454 |
| 2019/0147304 | A1* | 5/2019 | Liu | G06K 9/6227 |
| | | | | 382/157 |
| 2020/0285916 | A1* | 9/2020 | Wang | G06V 10/40 |
| 2022/0067461 | A1* | 3/2022 | Ampanavos | G06K 9/6251 |
| 2022/0237935 | A1* | 7/2022 | Liu | G06T 11/203 |

OTHER PUBLICATIONS

DeepFont: Identify Your Font from An Image, Proceedings of the 23rd ACM Int'l Conference on Multimedia, 451-59 (Oct. 2015).

The Architecture of Emergent Self-Organizing Maps to Reduce Projection Errors, Esann, 1-6 (2005).

Wikipedia: The Free Encyclopedia; "Self-organizing map"; Date downloaded Sep. 2, 2020; https://en.wikipedia.org/wiki/Self-organizing_map.

* cited by examiner

Fig. 3

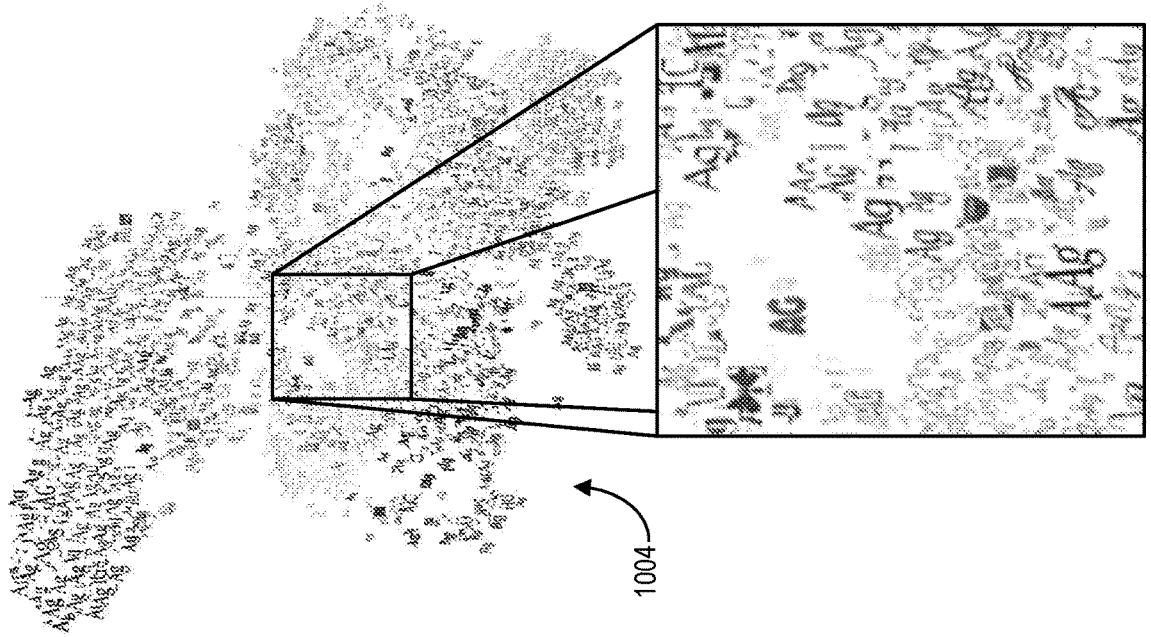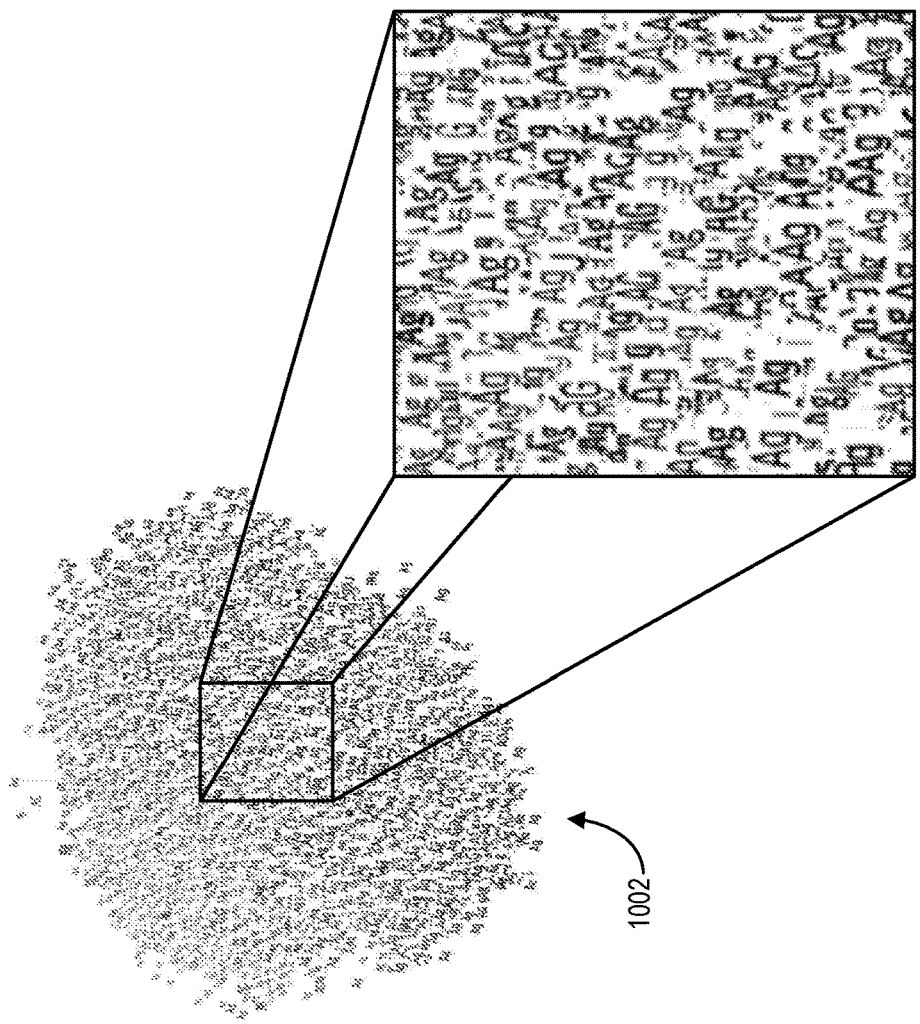
Fig. 10

ORGANIZING AND REPRESENTING A COLLECTION OF FONTS ACCORDING TO VISUAL SIMILARITY UTILIZING MACHINE LEARNING

BACKGROUND

In the field of digital content editing, font management systems have developed various presentations or selection mechanisms for designers or other users to select fonts. For instance, font management systems sometimes present example text using various fonts to show a designer what the fonts look like and other times present descriptions or groupings of various fonts. While conventional font management systems provide some tools to aid in font selection, such conventional systems nevertheless demonstrate a number of technical disadvantages.

For example, many conventional font management systems manage and present fonts using rigid and limited computing models. In some such cases, conventional systems organize and present fonts in sequential lists or groupings by presenting fonts alphabetically or presenting fonts according to broad and rigid typeface categories, such as by grouping serif or gothic typefaces together according to conventional tags or keywords. As a result of their limited approach to presenting fonts, conventional systems have difficulty adapting to a designer's desired aesthetic or provide guidance for more granular font selection based on the aesthetics of a font.

Due at least in part to their limitations in organizing or presenting fonts, conventional font management systems also inefficiently present graphical user interfaces for navigating among fonts and inefficiently consume computing resources. For instance, conventional systems inefficiently utilize processing time, processing power, and memory in processing user interactions to access desired data and/or functionality in selecting fonts ordered alphabetically or by typeface groupings. Indeed, conventional systems can require excessive user interactions to navigate to and select fonts within the lists in which they are presented. For a user to select a font using a conventional system, for instance, the user must either know the name of the font to enter as a search query or must scroll through a long list of fonts to find a font with a desired visual appearance. Such scrolling can be especially tedious when the number of fonts become large, as is the case with many conventional font management systems.

Thus, there are several disadvantages with regard to conventional font management systems.

SUMMARY

This disclosure describes one or more embodiments of methods, non-transitory computer readable media, and systems that provide benefits and solve one or more of the foregoing or other problems in the art. In particular, the disclosed systems utilize a visual-feature-classification model to generate font maps that efficiently and accurately organize fonts based on visual similarities. For example, the disclosed systems can extract features from fonts of varying styles and utilize a self-organizing map (or other visual-feature-classification model) to map extracted font features to positions within font maps. Such font maps may be two dimensional or three dimensional (or n-dimensional) and have fonts mapped to positions based on visual attributes indicated by the font features. In some cases, the disclosed systems also magnify areas of font maps by mapping some fonts within a bounded area to positions within a higher-resolution font map. Having generated or resized a font map, the disclosed systems can further navigate the font map to identify visually similar fonts (e.g., fonts within a threshold similarity). By generating a font map using a visual-feature-classification model, the disclosed systems can efficiently and accurately organize fonts in a visually coherent map to enhance font identification and presentation in graphical user interfaces.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 3 illustrates visual depiction of a font map in accordance with one or more embodiments;

FIG. 10 illustrates three-dimensional, freely spaced fonts maps generated using alternative visual-feature-classification models in accordance with one or more embodiments;

DETAILED DESCRIPTION

Figure 1:
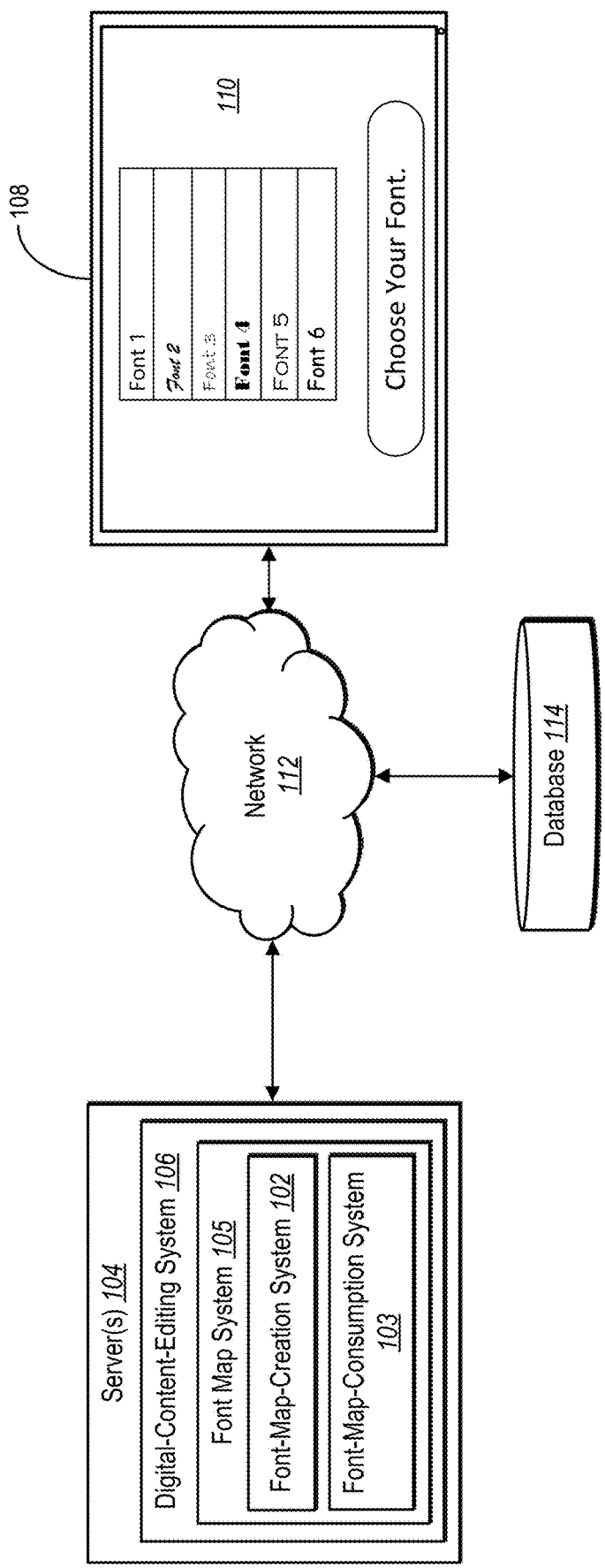
FIG. 1 illustrates an example system environment in which a font map system, including a font-map-creation system and a font-map-consumption system, can operate in accordance with one or more embodiments.

This disclosure describes one or more embodiments of a font map system that organizes and presents fonts based on visual similarities by utilizing a visual-feature-classification model. In some cases, for instance, the font map system utilizes a self-organizing map (or other visual-feature-classification model) to determine visual similarities among fonts based on extracted features associated with the fonts. The font map system further arranges the fonts within a font map according to the visual similarities to thereby group visually similar fonts together in nearby areas of the font map. For example, in certain implementations, the font-map-creation system utilizes a self-organizing map to arrange the fonts according to visual similarities. In some embodiments, the font map system selects font(s) to include or recommend within a visual depiction by traversing the font map in accordance with one or more traversal rules. In some cases, the font map system generates font maps and visual depictions of fonts as an offline process for transparent updates and/or software product integrations.

In some embodiments described herein, the font map system performs actions or functions associated with one or more subsystems, such as a font-map-creation system and a font-map-consumption system. Indeed, in some cases, the font map system performs actions associated with a font-map-creation system by utilizing a visual-feature-classification model (e.g., a self-organizing map) to generate a font map by arranging fonts according to visual similarities. In some embodiments, the font map system further performs actions associated with a font-map-consumption system that generates (or presents) a visual depiction of a font map and receives indications of user interactions with the font map (e.g., a font selection). While this disclosure generally describes actions and features in terms of a font-map-creation system and a font-map-consumption system as subsystems, the disclosed font map system likewise performs such actions and exhibits such features described herein.

As mentioned, in some embodiments, the font-map-creation system determines visual similarities of fonts by utilizing a visual-feature-classification model. To determine visual similarities, the font-map-creation system extracts features from fonts, including visible features and/or latent, unobservable (e.g., deep) features. For example, the font-map-creation system utilizes an encoder neural network to extract features from a plurality of fonts associated with a client device. Thus, the font-map-creation system generates font-feature vectors that represent the extracted features of the fonts.

In addition to extracting font features, in one or more embodiments, the font-map-creation system determines visual similarities between fonts by comparing the features of the fonts within a latent feature space. For example, the font-map-creation system determines feature distances (e.g., Euclidean distances) between font-feature vectors in the latent space. The font-map-creation system thus determines visual similarities among fonts based on their respective distances. In some embodiments, the font-map-creation system utilizes a visual-feature-classification model to map the font features to a latent space and to determine the visual similarities by, for example, determining distances between font-feature vectors within a font map.

For instance, the font-map-creation system utilizes a visual-feature-classification model in the form of a self-organizing map that is trained to map fonts according to visual similarities. In some cases, the font-map-creation system inputs a vector of font features into the self-organizing map, which thereby places the vector at a location within a font map based on the weights associated with various nodes of the self-organizing map. The font-map-creation system thus maps the feature vectors of fonts to arrange them within the font map according to visual similarities in relation to other fonts. Indeed, the font-map-creation system creates a font map to arrange fonts (or features corresponding to fonts) according to visual similarities based on a neighborhood function, where fonts that look alike (e.g., that have similar features) are grouped together or near each other within the font map.

In some embodiments, the font-map-creation system trains or tunes the self-organizing map based on sample feature vectors representing sample fonts to accurately map fonts within a font map. Indeed, the font-map-creation system trains the self-organizing map by introducing a new technique for identifying best-matching nodes during the training process. For instance, the font-map-creation system utilizes the self-organizing map to compare a sample feature vector representing a sample font with node weights within the self-organizing map, placing an emphasis on prioritizing nodes with u-matrix values that exceed a u-matrix-value threshold. Additional detail regarding training and applying the self-organizing map is provided below with reference to the figures.

As mentioned above, in some embodiments, the font-map-consumption system generates and provides a visual depiction of fonts for display on a client device. More specifically, in some cases, the font-map-consumption system accesses and selects one or more fonts to display within the visual depiction. To select fonts for display, the font-map-consumption system selects all or a portion of a font map (from the font-map-creation system) and visually depicts fonts represented by the font map by identifying fonts for nodes or positions within the font map (e.g., fonts whose feature vectors map to the nodes). In some embodiments, the font-map-consumption system traverses or navigates the font map to select fonts to include within a visual depiction, in accordance with one or more traversal rules. For example, the font-map-consumption system traverses the font map to identify and select fonts that are within a threshold similarity of each other. Thus, the font-map-consumption system traverses a font map by following directions where visual attributes remain similar from node to node. As another example, the font-map-consumption system traverses the font map to select fonts that have at least a threshold difference in appearance between them to provide a wider array of font options.

In some embodiments, the font-map-consumption system traverses the font map by selecting a font (or a feature vector of a font) and subsequently selects other fonts in a sequence, one after the other. Each font that the font-map-consumption system selects in the sequence has at least a threshold visual similarity (or less than a threshold difference in visual appearance) in relation to the font previously selected in the sequence. In some cases, the font-map-consumption system utilizes a particular font-map-traversal rule to maintain smooth transitions between different fonts. For example, the font-map-consumption system navigates the font map along cardinal directions, following nearest neighbors in the latent feature space (while visiting neighbors in the map space), or following a gradient of a u-matrix corresponding to the font map. From the traversal of the font map, the font-map-consumption system identifies and selects fonts for presenting on a client device. For instance, in some embodiments, the font-map-consumption system identifies fonts that are visually similar to a user-selected font within the font map to provide for display within a font list.

In addition to generating an initial font map, in some embodiments, the font-map-creation system generates an adaptive-resolution font map that has multiple resolutions. To elaborate, the font-map-creation system facilitates font selection at different levels of granularity by providing a lower-resolution font map with fewer fonts and/or fonts representing larger categories or families of fonts. In some cases, the font-map-creation system generates and provide a higher-resolution font map that includes more fonts and/or fonts at a more granular level with slighter differences in visual appearance between neighboring fonts. In some embodiments, the font-map-creation system provides a higher-resolution font map based on user selection of a font within a lower-resolution font map. By accessing these higher-resolution font maps from the font-map-creation system, the font-map-consumption system helps a designer identify desired fonts with a preferred appearance at a more precise level.

In some embodiments, the font-map-creation system fixes a boundary condition for a font map to generate such a higher-resolution font map. For example, the font-map-creation system identifies a target area of a lower-resolution font map (e.g., based on user selection). In some implementations, the font-map-creation system further fixes boundary conditions to generate a higher-resolution font map for the target area, such that the font-map-creation system identifies additional fonts on a more granular level that belong within the target area based on visual similarities. In one or more embodiments, the font-map-creation system fixes the boundary conditions by identifying certain nodes (or corresponding node weights) for the boundary of the target area and interpolating between the nodes (or the node weights) to increase the number of nodes, or the resolution, within the target area. For example, font-map-creation system identifies fonts (or their corresponding feature vectors) that map to the target area at the higher resolution by comparing node weights for the added nodes to feature vectors of fonts. Additional detail regarding generating font maps at different resolutions (or different areas of a single font map at different resolutions) is provided below with reference to the figures.

In one or more embodiments, the font-map-creation system utilizes a visual-feature-classification model to arrange and present stylized graphics according to visual similarity. Such stylized graphics may include logos, emblems, fonts, icons, graphic designs, and so forth. Indeed, in addition (or alternatively) to arranging fonts based on visual similarities between fonts, in certain implementations, the font-map-creation system utilizes the techniques described herein to arrange, and provide visual depictions of, stylized graphics according to visual similarities between the stylized graphics. To map stylized graphics, for instance, the font-map-creation system extracts features from stylized graphics using an encoder neural network to generate stylized-graphic-feature vectors. Further, the font-map-creation system maps the stylized-graphic-feature vectors to a stylized-graphic map using a self-organizing map. In some cases, the font-map-consumption system generates a visual depiction of one or more stylized graphics by selecting stylized-graphic-feature vectors from the stylized-graphic map. Accordingly, in certain embodiments, a reference to a "font" in this disclosure may be replaced by a "stylized graphic."

As suggested above, the font map system (including the font-map-creation system and the font-map-consumption system) provides several advantages over conventional font management systems. For example, the font map system provides a new technology by using a visual-feature-classification model to generate a font map for arranging fonts according to visual appearance or similarity and selecting fonts for display. In particular, the font map system extracts features from fonts of varying styles and utilizes a self-organizing map (or other visual-feature-classification model) to generate a font map by arranging fonts based on visual similarity of the extracted features. By contrast, many conventional font management systems rigidly present fonts as a listing in alphabetical (or some other categorical) order. The font map system can map fonts to a font map by implementing an ordered set of unconventional steps that previous systems do not capture or suggest. For example, in some cases, the font map system captures a new font map by implementing unconventional steps including determining visual similarities among fonts using a visual-feature-classification model (e.g., a self-organizing map) and mapping fonts to a font map using the visual-feature-classification model to arrange fonts according to visual or perceptual similarity.

As a result of being able to present fonts based on visual similarity, unlike many conventional systems, the font map system further provides varying levels of granularity for font selection. For example, the font map system enables a designer to select a font and subsequently presents other fonts with similar visual characteristics to the selected font. The font map system thus improves navigability of fonts and provides more precise control of font selection when compared to conventional systems.

Due at least in part to the new font map and other technology provided by the font map system, in certain implementations, the font map system more efficiently uses computing resources and facilitates navigation among fonts relative to many conventional font management systems. For example, the font-map-consumption system utilizes fewer computing resources, such as processing time, processing power, and memory by requiring fewer user interactions to access desired data and/or functionality in selecting fonts. Indeed, the font-map-consumption system provides more efficient user interfaces than many conventional systems by arranging or suggesting fonts according to visual similarities. For example, the font-map-consumption system generates and provides a visual depiction of fonts from a font map based on visual similarities among the fonts. Rather than requiring excessive user input to navigate to and select a font by scrolling through hundreds of fonts in a list like some conventional font management systems, the font-map-consumption system provides a more intelligent appearance-based representation for quicker font selection requiring fewer user inputs.

Beyond improving efficiency, in some embodiments, the font map system more accurately identifies visual similarities among fonts and presents or recommends visually similar fonts more accurately than conventional font management systems. By utilizing the visual-feature-classification model, the font map system generates a font map that more accurately organizes or represents visual similarities between fonts and facilitates presenting or recommending fonts according to such visual similarity. To elaborate, the font map system utilizes a visual-feature-classification model that can accurately represent nuanced detail in the visual appearance of fonts in a font map and that does so without introducing excess noise that would otherwise disrupt the representation of fonts, especially when visual differences between fonts are finer or less perceptible. Thus, the font map system accurately generates a visual depiction of similar fonts with the necessary granularity for selecting between fonts that look alike.

As suggested by the foregoing discussion, this disclosure utilizes a variety of terms to describe features and benefits of the font map system. Additional detail is hereafter provided regarding the meaning of these terms as used in this disclosure. In particular, the term "font" refers to a set of glyphs of a particular style. For example, a font can include a set of glyphs in a particular font face or in a particular font family. Indeed, a font can include (i) glyphs in a font face, such as Times New Roman Bold Italic, Garamond Bold Italic, or Courier Regular; or (ii) glyphs in a font family (which includes constituent font faces), such as Times New Roman, Garamond, or Courier.

In addition, the term "feature" refers to a characteristic or attribute of a font that reflects or represents a visual or perceptual appearance of the font. In some embodiments, features include observable characteristics of a font. Additionally (or alternatively), features can include latent features and/or multidimensional deep features that are unobservable or imperceptible. Features, observable or unobservable, can relate to or define the visual appearance of fonts. Example features include, but are not necessarily limited to, character weight, slant, presence of serif, and character tightness. Thus, a "font-feature vector" (or simply "feature vector") refers to a vector of features that represents a particular font.

As mentioned, the font-map-creation system extracts features from fonts utilizing an encoder neural network. As used herein, the term "encoder neural network" refers to a neural network (or one or more layers of a neural network) that extract features relating from fonts. In some cases, an encoder neural network refers to a neural network that both extracts and encodes features from a font into a feature vector. For example, an encoder neural network can include a particular number of layers including one or more fully connected and/or partially connected layers of neurons that identify and represent visible and/or unobservable characteristics of a font. An encoder neural network can further generate feature vectors from the extracted features to represent fonts. In some embodiments, an encoder neural network refers to a convolutional neural network, such as a DeepFont neural network or a Rekognition neural network.

Relatedly, the term "neural network" refers to a machine learning model that can be trained and/or tuned based on inputs to determine classifications or approximate unknown functions. In particular, the term neural network can include a model of interconnected artificial neurons (e.g., organized in layers) that communicate and learn to approximate complex functions and generate outputs (e.g., determinations of digital image classes) based on a plurality of inputs provided to the neural network. In addition, a neural network can refer to an algorithm (or set of algorithms) that implements deep learning techniques to model high-level abstractions in data.

In some embodiments, the font-map-creation system inputs extracted features into a visual-feature-classification model to determine visual similarities among the fonts. As used herein, the term "visual-feature-classification model" refers to a machine learning model, such as a neural network, that analyzes features of fonts to classify or otherwise arrange the fonts based on their visual appearance. In particular, a visual-feature-classification model arranges fonts based on visual similarity in relation to each other, where like fonts are placed together.

In some embodiments, the font-map-creation system utilizes a visual-feature-classification model in the form of a self-organizing map. As used herein, the term "self-organizing map" refers to a type of artificial neural network that is trained using unsupervised learning to produce a discretized representation of an input space (i.e., a map) based on a neighborhood function to preserve topological properties of the input space. A self-organizing map includes multiple "nodes" (or neurons) which define the layout of the map and which have corresponding weights that the font-map-creation system adjusts during training. A self-organizing map produces a representation in which the pairwise difference between adjacent nodes is minimized across the entire space. The font-map-creation system compares the weights of the nodes to input feature vectors for fonts to determine where the fonts (or their corresponding feature vectors) belong in the map (e.g., to determine which node is the best match). Indeed, in some cases, a node of a font map has a corresponding weight vector that is made up of the node weights that define the node. Accordingly, depending on the resolution of a font map and/or a number of fonts to map to the font map, a single node can represent a single font or can represent multiple fonts. Alternatively, in certain embodiments, a visual-feature-classification model refers to another machine-learning model for classification, such as principal component analysis ("PCA") model or a t-distributed stochastic neighbor embedding ("t-SNE") model.

Relatedly, the term "font map" refers to a discretized, n-dimensional organization or arrangement of feature vectors of fonts. A font map can refer to a self-organizing map that is trained or tuned such that feature vectors of fonts map to particular nodes of the self-organizing map to thereby arrange the feature vectors according to visual similarities. Particularly, a font map includes or represents a plurality of fonts (or features corresponding to fonts) arranged according to visual similarities based on a neighborhood function, where fonts that look alike (e.g., that have similar features) are grouped together or near each other within the font map. In some embodiments, a font map has a particular "resolution" (or multiple resolutions) which defines a granularity or a level of detail at which the font map represents fonts. Higher-resolution font maps (or higher-resolution areas of font maps) include or represent fonts with more detail using more nodes in a higher density. Lower-resolution font maps (or lower-resolution areas of font maps) include or represent fonts with less detail using fewer nodes in a lower density (e.g., where a node can represent an entire family of fonts of similar styles). An adaptive-resolution font map includes multiple resolutions for different areas of the font map.

In addition, the term "visual similarity" refers to a measure of likeness in visual appearance or visual characteristics. In some cases, visual similarity refers to a measure of how much one font may resemble or look like another font, as indicated by their respective features. Visual similarity between two fonts can be represented by a feature distance (e.g., a Euclidean distance) between the feature vectors within a feature space (e.g., within a font map) or between nodes of a font map that correspond to particular feature vectors. For example, visual similarity can be represented by visible and non-visible features alike to depict visible font characteristics including, but not limited to, serif fonts, bold fonts, script fonts, block-letter fonts, and other characteristics associated with fonts.

As mentioned, in some embodiments, the font-map-creation system identifies what this disclosure refers to as a target area of a font map (e.g., of an adaptive-resolution font map). Particularly, the font-map-creation system identifies a target area for presenting fonts with an increased resolution. As used herein, the term "target area" refers to an area (or a volume for three-dimensional font maps) of a font map designated for increased resolution to represent fonts at an increased level of detail. Indeed, a target area can have a particular boundary as defined by fonts (or features of fonts) in a particular area of a font map. The font-map-creation system can thus fix boundary conditions for the target area based on the fonts in the boundary and interpolate between node weights of the nodes within the boundary as well as node weights of those nodes within the target area to increase the resolution of the target area to represent a greater number of fonts at a greater level of detail (e.g., where the differences in visual appearance between fonts are finer or less drastic than in lower-resolution areas).

As further mentioned above, in some cases, the font-map-consumption system traverses a font map to select fonts to include in a visual depiction of fonts. As used herein, the term "traverse" refers to a process of navigating or walking within a font map. In certain implementations, traverse refers to navigating or walking within a font map to identify or select fonts for including in a visual depiction based on visual similarity in relation to each other. In some embodiments, traversing a font map includes identifying an initial location within a font map (e.g., an initial node or font) and sequentially navigating to an adjacent location, and then another adjacent location after that, and so forth, based on one or more rules. For example, the font-map-consumption system traverses to adjacent fonts or nodes by identifying which fonts or nodes have at least a threshold similarity to (or have less than a threshold difference from) a current font or node. In some embodiments, the font-map-consumption system traverses a font map along cardinal directions, following nearest neighbors in feature space while always visiting neighbors in the map space, or following a gradient of a u-matrix that corresponds to the font map.

Relatedly, the term "u-matrix" refers to a two-dimensional visualization of data from a self-organizing map, which can sometimes represent a high-dimensional space. For example, a u-matrix refers to a representation of a self-organizing map where Euclidean distance between vectors of neighboring nodes is depicted in a grayscale image. Additionally, a "u-matrix value" refers to a value within a u-matrix that reflects a measure of difference (or visual dissimilarity) between neighboring nodes of a corresponding font map. Thus, high peaks in a u-matrix, or areas with high u-matrix values, represent areas of a font map where neighboring nodes are more different than in other areas.

Additional detail regarding the font map system (including the font-map-creation system and the font-map-consumption system) will now be provided with reference to the figures. For example, FIG. 1 illustrates a schematic diagram of an example system environment for implementing a font map system 105 including a font-map-creation system 102 and a font-map-consumption system 103 in accordance with one or more embodiments. An overview of the font map system 105 is described in relation to FIG. 1. Thereafter, a more detailed description of the components and processes of the font map system 105 is provided in relation to the subsequent figures.

As shown, the environment includes server(s) 104, a client device 108, a database 114, and a network 112. Each of the components of the environment can communicate via the network 112, and the network 112 may be any suitable network over which computing devices can communicate. Example networks are discussed in more detail below in relation to FIG. 13.

As mentioned, the environment includes a client device 108. The client device 108 can be one of a variety of computing devices, including a smartphone, a tablet, a smart television, a desktop computer, a laptop computer, a virtual reality device, an augmented reality device, or another computing device as described in relation to FIG. 13. Although FIG. 1 illustrates a single client device 108, in some embodiments the environment can include multiple different client devices, each associated with a different user (e.g., designer). The client device 108 can communicate with the server(s) 104 via the network 112. For example, the client device 108 can receive user input from a user interacting with the client device 108 (e.g., via the client application 110) to, for example, select a font, navigate between fonts, or type using a particular font. Thus, the font map system 105 on the server(s) 104 can receive information or instructions to identify particular fonts (or can do so automatically without user input) and can generate visual depictions of higher-resolution font maps for more granular, detailed font selection based on the input received by the client device 108.

As shown, the client device 108 includes a client application 110. In particular, the client application 110 may be a web application, a native application installed on the client device 108 (e.g., a mobile application, a desktop application), or a cloud-based application where all or part of the functionality is performed by the server(s) 104. The client application 110 can present or display information to a user, including a graphical user interface for displaying and/or selecting fonts from among a plurality of fonts. Additionally, the client application 110 can present a visual depiction of fonts arranged according to visual similarity in relation to each other. The client application 110 can also include additional visual depictions for more detailed font selection. Indeed, a user can interact with the client application 110 to provide user input to select a font from a lower-resolution font map, and the client application 110 can subsequently present a visual depiction of a higher-resolution font map for more detailed, precise font selection of fonts similar in appearance to the font selected from the lower-resolution font map.

As illustrated in FIG. 1, the environment includes the server(s) 104. The server(s) 104 may generate, track, store, process, receive, and transmit electronic data, such as data for feature vectors, font maps, u-matrix values, visual depictions of fonts, and indications of user interaction. For example, the server(s) 104 may receive data from the client device 108 in the form of a selection of a font or a request to select from a plurality of fonts. In addition, the server(s) 104 can transmit data to the client device 108 to provide a visual depiction of one or more fonts for display within a user interface of the client application 110. Indeed, the server(s) 104 can communicate with the client device 108 to transmit and/or receive data via the network 112. In some embodiments, the server(s) 104 comprise a distributed server where the server(s) 104 includes a number of server devices distributed across the network 112 and located in different physical locations. The server(s) 104 can comprise a content server, an application server, a communication server, a web-hosting server, or a machine learning server.

As shown in FIG. 1, the server(s) 104 can also include the font map system 105 as part of a digital-content-editing system 106 and that includes the font-map-creation system 102 and the font-map-consumption system 103. The digital-content-editing system 106 can communicate with the client device 108 to perform various functions associated with the client application 110, such as providing and modifying visual depiction of fonts based on a font map. For example, the font-map-creation system 102 can communicate with the database 114 to access and store fonts, font maps, u-matrices, feature vectors, and node weights for font maps. Indeed, as further shown in FIG. 1, the environment includes a database 114. In particular, the database 114 can store information, such as fonts, sample feature vectors, font maps, u-matrices, feature vectors, and node weights for font maps. In some embodiments, the database 114 also stores one or more components of a self-organizing map, including a neighborhood algorithm, node weights, and other parameters.

As depicted in FIG. 1, the font-map-creation system 102 and the font-map-consumption system 103 communicate to transfer information back and forth. For example, the font-map-consumption system 103 accesses a font map generated by the font-map-creation system 102. The font-map-consumption system 103 further generates, from the font map, a visual depiction of the font map for display on the client device 108 (via the client application 110). Indeed, the client application 110 provides user interfaces for interacting with the font-map-consumption system 103 to navigate through font maps or other visual depictions and to select and/or purchase fonts shown within the client application 110.

Although FIG. 1 illustrates a particular arrangement of the environment, in some embodiments, the environment may have a different arrangement of components and/or may have a different number or set of components altogether. For instance, in some embodiments, the font map system 105 may be implemented by (e.g., located entirely or in part) on the client device 108 and/or a third-party device. In addition, the client device 108 may communicate directly with the font map system 105, bypassing the network 112. Further, the database 114 can be located external to the server(s) 104 (e.g., in communication via the network 112) or located on the server(s) 104 and/or on the client device 108. Further still, the font-map-creation system 102 and the font-map-consumption system 103 can be located in different places or be located on different computing devices from each other and in communication via the network 112. For example, in some embodiments, the font-map-creation system 102 and the font-map-consumption system 103 are hosted by different servers, at different locations, or on subsystem hosted by the server(s) 104 and another subsystem on the client device 108 as an application.

Figure 2:
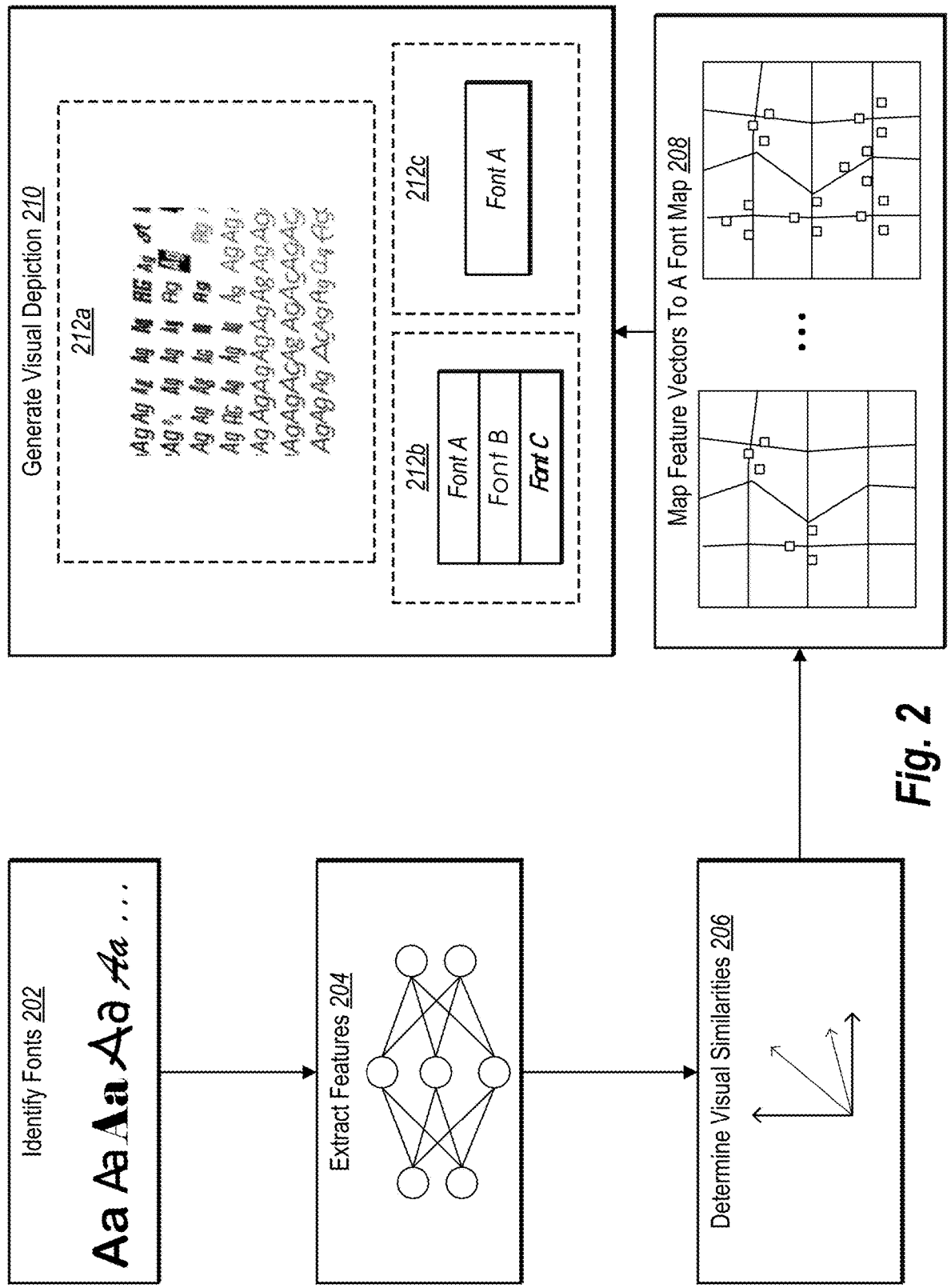
FIG. 2 illustrates an overview of a font-map-creation system generating a font map in accordance with one or more embodiments.

As mentioned, in some embodiments, the font-map-creation system 102 generates a visual depiction of visually similar fonts by selecting fonts from a font map. In particular, the font-map-creation system 102 generates a font map utilizing a visual-feature-classification model, such as a self-organizing map, to arrange fonts according to visual similarity. FIG. 2 illustrates a series of acts that the font-map-creation system 102 performs to generate a font map in accordance with one or more embodiments.

As illustrated in FIG. 2, the font-map-creation system 102 performs an act 202 to identify fonts. In particular, in some cases, the font-map-creation system 102 identifies a plurality of fonts associated with the client device 108. For example, the font-map-creation system 102 identifies fonts installed on the client device 108 and/or fonts that are part of the client application 110. In some embodiments, the font-map-creation system 102 accesses the database 114 to identify fonts that are installed on the client device 108 and/or that are part of the client application 110. In the same or other embodiments, the font-map-creation system 102 identifies fonts that are missing from, or that could potentially be installed on, the client device 108 for use within the client application 110. For example, in certain implementations, the font-map-creation system 102 generates a font map including all or a subset of fonts from (or associated with) a particular font database (e.g., ADOBE fonts). In such cases, the font-map-consumption system 103 can provide access to all or a subset of such fonts (e.g., ADOBE fonts) via the client device 108 (e.g., for download into the client application 110).

Upon identifying the fonts, the font-map-creation system 102 further performs an act 204 to extract features from the fonts. More specifically, the font-map-creation system 102 extracts features (e.g., deep features) from the fonts that represent characteristics of the fonts including visual appearance. To extract the features, the font-map-creation system 102 utilizes an encoder neural network (represented by the interconnected neurons shown in FIG. 2 within the act 204). For example, in some embodiments, the font-map-creation system 102 utilizes a deep encoder neural network, such as DeepFont, which is an encoder neural network developed by ADOBE INC, as described by Zhangyang Wang, Jianchao Yang, Hailin Jin, Eli Shectman, Aseem Agarwala, Jonathan Brandt, and Thomas S. Huang in *DeepFont: Identify Your Font from An Image*, Proceedings of the $23^{rd}$ ACM Int'l Conference on Multimedia, 451-59 (October 2015), which is incorporated herein by reference in its entirety. In other embodiments, the font-map-creation system 102 utilizes a different neural network, such as the Rekognition neural network or some other convolutional neural network. Indeed, the font-map-creation system 102 inputs the identified fonts into an encoder neural network, which analyzes the fonts to extract features and generate feature vectors corresponding to the fonts. Thus, the font-map-creation system 102 generates a feature vector for each identified font.

As further illustrated in FIG. 2, the font-map-creation system 102 performs an act 206 to determine visual similarities among the identified fonts. Particularly, the font-map-creation system 102 determines visual similarities between fonts by determining relationships between feature vectors associated with the fonts. For instance, the font-map-creation system 102 compares feature vectors within a feature space. In some embodiments, the font-map-creation system 102 determines distances (e.g., Euclidean distances) between feature vectors of fonts within a feature space.

More specifically, the font-map-creation system 102 utilizes a visual-feature-classification model to determine distances between feature vectors within a particular feature space. For example, the font-map-creation system 102 organizes the feature vectors within a particular feature space, such as within a font map. In some embodiments, the font-map-creation system 102 utilizes a visual-feature-classification model in the form of a self-organizing map to determine respective locations (e.g., nodes) for feature vectors within the feature space and to determine distances between those respective locations. In these or other embodiments, the font-map-creation system 102 utilizes a self-organizing map, such as an emergent self-organizing map, to create smooth transitions between areas of different weights. For example, in some embodiments, the font-map-creation system 102 utilizes the emergent self-organizing map as described by Alfred Ultsch and Lutz Herrmann in *The Architecture of Emergent Self-Organizing Maps to Reduce Projection Errors*, Esann, 1-6 (2005), which is incorporated herein by reference in its entirety.

As further shown in FIG. 2, the font-map-creation system 102 performs an act 208 to map feature vectors to a font map. Indeed, the font-map-creation system 102 maps feature vectors utilizing a self-organizing map that arranges feature vectors of fonts within the font map according to visual similarities. Particularly, once the font-map-creation system 102 trains a self-organizing map, the font-map-creation system 102 projects a number of fonts in the resulting space to generate a font map. The font-map-creation system 102 may, for example, arrange feature vectors of font faces within the font map according to visual similarities of font faces. By contrast, the font-map-creation system 102 may arrange feature vectors of font families within the font map according to visual similarities of font families. In some embodiments, the font-map-creation system 102 projects or maps 129,255 fonts from https://www.myfonts.com to generate the font map using a trained self-organizing map. Once the self-organizing map is trained and the font map is generated, the font-map-creation system 102 can map new fonts to the font map instantaneously (or nearly instantaneously).

For example, the font-map-creation system 102 maps feature vectors corresponding to fonts to particular nodes within a font map. Indeed, the font-map-creation system 102 compares nodes of a self-organizing map to features vectors of fonts to determine where in the font map a particular feature vector belongs. For example, the font-map-creation system 102 compares weights of each node within the font map with the font-feature vectors to identify nodes with weights that are the closest to the feature vectors. The font-map-creation system 102 thus determines nodes corresponding to the feature vectors (or corresponding to the associated fonts) and maps visually similar fonts to nearby nodes of the font map. In some embodiments, the font-map-creation system 102 determines the visual similarities by determining distances between feature vectors within the font map and/or by determining distances between nodes to which the feature vectors are mapped within the font map.

After the font-map-creation system 102 generates a font map, the font-map-consumption system 103 performs an act 210 to generate a visual depiction of fonts. Indeed, the font-map-consumption system 103 accesses a font map generated by the font-map-creation system 102 to generate and provide a visual depiction of fonts for display via the client device 108 from the font map. For example, in certain implementations, the font-map-consumption system 103 generates a visual depiction 212a, a visual depiction 212b, or a visual depiction 212c (or some other visual depiction). In particular, the font-map-consumption system 103 generates a visual depiction of one or more of the fonts that are associated with the client device 108 (e.g., as identified in the act 202). For example, in some embodiments, the font-map-consumption system 103 generates a depiction of fonts that are installed on, or that could be installed on, the client device 108 (e.g., from a particular font database). To generate the visual depiction, the font-map-consumption system 103 selects one or more fonts from the font map to provide for display within a graphical user interface of the client application 110. For example, the font-map-consumption system 103 selects fonts from a font map to include within a visual depiction. In some embodiments, the font-map-consumption system 103 selects a subset of feature vectors from the font map and identifies the fonts corresponding to the feature vectors to provide a visual depiction of the what the fonts look like.

To generate the visual depiction 212a, as illustrated in FIG. 2, the font-map-consumption system 103 selects a portion of a font map and presents the fonts laid out in an arrangement that corresponds to the locations of font-feature vectors within the selected portion of the font map. In some embodiments, however, the font-map-consumption system 103 selects a subset of fonts by identifying visually similar fonts (e.g., fonts within a threshold visual similarity of each other) to include within the visual depiction 212b in the form of a listing of fonts. In other embodiments, the font-map-consumption system 103 selects fonts that are visually dissimilar (e.g., fonts with at least a threshold difference in visual appearance) to include within the visual depiction 212b. In still other embodiments, the font-map-consumption system 103 samples feature vectors from the font map using a particular (e.g., random) sampling algorithm to select fonts (the fonts that correspond to the selected feature vectors) to include with the visual depiction 212b. While the visual depiction 212b includes three fonts, in certain implementations, the visual depiction 212b includes more or fewer fonts, up to a listing of all fonts associated with the client device 108 arranged by visual similarity.

As noted above and depicted in FIG. 2, in some embodiments, the font-map-consumption system 103 generates the visual depiction 212c to display one or more best-matching fonts (e.g., as a recommendation). To generate and provide the visual depiction 212c, the font-map-consumption system 103 identifies best-matching feature vectors for nodes of the font map and generates visual depictions of fonts corresponding to the best-matching feature vectors to include within the visual depiction 212c. Based on identifying best-matching feature vectors, the font-map-consumption system 103 generates the visual depiction 212c. In certain implementations, the font-map-consumption system 103 generates the visual depiction 212a or 212b based on identifying best-matching feature vectors. For instance, the font-map-consumption system 103 generates the visual depiction 212a that resembles the layout of the font map, where fonts corresponding to best-matching feature vectors are depicted at locations corresponding to respective node locations within the font map.

To determine best-matching feature vectors, in certain implementations, the font-map-consumption system 103 compares a plurality of feature vectors of fonts mapped to a single node of the font map. The font-map-consumption system 103 further identifies a best-matching feature vector from among the plurality of feature vectors mapped to the single node. Particularly, the font-map-consumption system 103 identifies a best-matching feature vector as a feature vector having a smallest difference (or distance in map space) from node weights corresponding to the single node. In addition, the font-map-consumption system 103 generates or identifies a visual depiction of a font corresponding to the best-matching feature vector to represent the single node within a visual depiction of the font map. In some embodiments, the font-map-creation system 102 compares feature vectors to identify best-matching nodes, and the font-map-consumption system 103 accesses information indicating the best-matching nodes to include with a visual depiction.

As another example, in certain implementations, the font-map-consumption system 103 provides a visual depiction of an entire font map. To elaborate, the font-map-consumption system 103 generates a visual depiction of the font map by visually representing feature vectors of fonts mapped to various nodes of the font map at locations corresponding to nodes of the font map. In some embodiments, the font-map-consumption system 103 generates two-dimensional or three-dimensional visual depictions of fonts from a font map (to correspond to a dimensionality of the font map generated by the font-map-creation system 102) to provide for display on the client device 108. For three-dimensional visual depictions, the font-map-consumption system 103 further provides selectable options for display on the client device 108 to enable a user to rotate or otherwise manipulate the visual depiction to select from available fonts.

By contrast, in some embodiments, the font-map-consumption system 103 selects fonts to include within the visual depiction by automatically (e.g., without user input) traversing the font map to select fonts to include in the visual depiction. For example, the font-map-consumption system 103 traverses (or causes the font-map-creation system 102 to traverse) the font map by selecting fonts with smooth transitions in visual appearance. In some embodiments, the font-map-consumption system 103 traverses the font map by following a gradient of a u-matrix corresponding to the font map. By following the gradient of the u-matrix, the font-map-consumption system 103 maintains smooth transitions between fonts by minimizing or reducing differences between sequentially selected neighboring nodes of the font map. This disclosure describes such traversing further below.

As indicated above, the font-map-consumption system 103 further provides the visual depiction for display on the client device 108. For example, the font-map-consumption system 103 provides a listing of fonts that are selected through the traversal of the font map (e.g., along a gradient of the u-matrix). In some embodiments, the font-map-consumption system 103 selects only a particular number of fonts (e.g., 5 or 10) to include within the visual depiction. In other embodiments, as mentioned above, the font-map-consumption system 103 provides a visual depiction of the entire font map for display. In one or more embodiments, the font-map-consumption system 103 provides particular sampled portions of a font map for display within a visual depiction. For example, the font-map-consumption system 103 selects fonts within a threshold similarity of each other. As another example, the font-map-consumption system 103 selects fonts with at least a threshold visual difference among them to give a user a wide range of possible fonts to select.

The font-map-consumption system 103 can further provide additional visual depictions for display. In certain implementations, for instance, the font-map-consumption system 103 receives an indication of user selection of a particular font from a visual depiction within the client application 110 and generates a visual depiction of additional (or alternative) fonts to provide for display on the client device 108. For example, the client device 108 receives a user selection of a font and provides an indication of the selection to the font-map-consumption system 103. Based on receiving the indication of the user selection, the font-map-consumption system 103 generates another visual depiction of additional fonts that are visually similar to the selected font. In some embodiments, the additional visual depiction corresponds to a higher-resolution font map that maps fonts at a higher resolution to represent finer visual differences between fonts. Additional detail regarding higher-resolution font maps is provided below with reference to FIG. 7.

Figure 3:
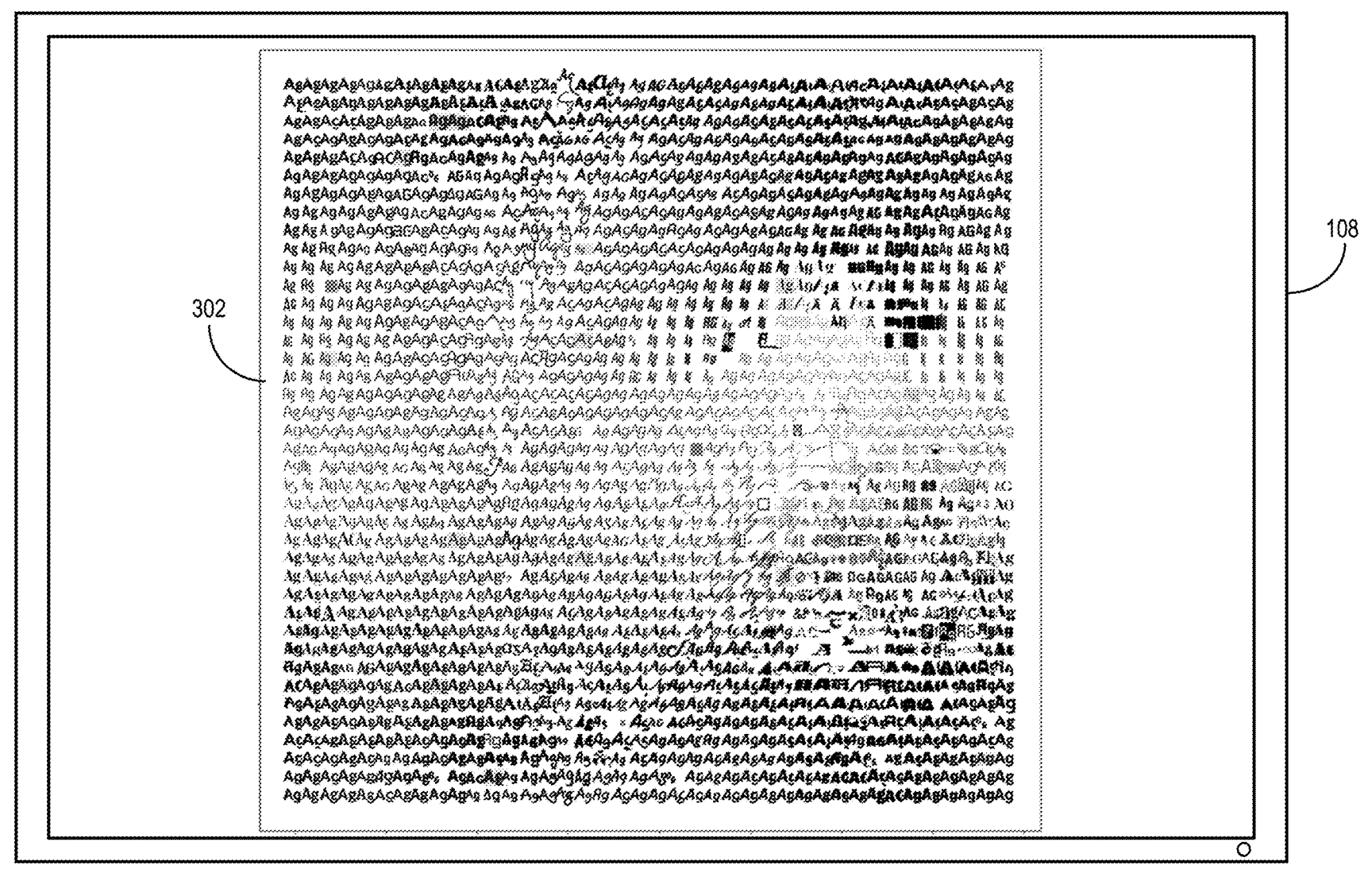

As mentioned above, in some embodiments, the font-map-creation system 102 generates a font map that maps feature vectors for fonts to nodes within the font map in an arrangement that reflects visual similarities between fonts. In particular, the font-map-creation system 102 utilizes a visual-feature-classification model, such as a self-organizing map, to generate a font map by mapping font-feature vectors to nodes. FIG. 3 illustrates the client device 108 displaying a visual depiction of a font map as a font-map visualization 302 in accordance with one or more embodiments.

As illustrated in FIG. 3, the font-map visualization 302 is a representation of particular fonts mapped to nodes within a font map for discussion purposes. Whereas the font-map visualization 302 constitutes a visual depiction, in certain implementations, the font map itself comprises an arrangement of vectors, nodes, and/or weights that may not be meaningful to a human observer (e.g., as a collection of feature vectors arranged in node locations of a font map). Indeed, the font-map visualization 302 depicts fonts of varying styles positioned with even spacing throughout a two-dimensional arrangement corresponding to locations of respective font-feature vectors. The font-map-creation system 102 maps the fonts to a font map underlying the font-map visualization 302 by comparing feature vectors of the fonts with node weights corresponding to nodes within the font map underlying the font-map visualization 302 and placing the feature vectors at nodes with node weights that are closest to the feature vectors.

As shown, the font-map visualization 302 depicts fonts that are visually similar together in common areas and transitions between the different font styles smoothly. In some embodiments, while the font-map visualization 302 is two-dimensional, the font-map visualization 302 can be continuous in that the leftmost font and the rightmost font in the same row are considered adjacent, and the topmost font and the bottommost font in the same column are considered adjacent, as if the font-map visualization 302 wraps around in three dimensions. Indeed, the top-left and bottom-left fonts of the font-map visualization 302 share some visual similarities, as do the top-left and top-right fonts. The font map corresponding to the font-map visualization 302 shares the same organization of visually similar fonts as represented by an arrangement of vectors, nodes, and/or node weights. Along these lines, the font-map-creation system 102 can generate three-dimensional font maps as well that are rotatable to view the continuous nature of the map depicting the relationships between fonts or nodes.

To map fonts to the font map underlying the font-map visualization 302, in certain implementations, the font-map-creation system 102 extracts features from the fonts to generate feature vectors for each of the fonts. For example, the font-map-creation system 102 utilizes an encoder neural network (e.g., DeepFont) to extract a 760-dimensional feature vector for each font. In addition, the font-map-creation system 102 maps the 760-dimensional feature vectors to nodes within the font map by comparing the feature vectors with node weights to identify nodes whose weights are closest to the feature vectors. For instance, in some cases, the font-map-creation system 102 compares a feature vector with node weights of a particular node by determining a Euclidean distance between the feature in map space or latent feature space.

As suggested above, in some embodiments, the font-map-creation system 102 maps feature vectors utilizing a visual-feature-classification model that arranges feature vectors of fonts within the font map underlying the font-map visualization 302 according to visual similarities. For instance, the font-map-creation system 102 may use a self-organizing map (or other visual-feature-classification model) to arrange feature vectors of font faces within the font map according to visual similarities of font faces, such as by mapping feature vectors for Times New Roman Bold Italic closer to feature vectors for Garamond Bold Italic than to feature vectors for Courier Regular. By contrast, the font-map-creation system 102 may arrange feature vectors of font families within the font map according to visual similarities of font families, such as by mapping feature vectors for Times New Roman closer to feature vectors for Garamond than to feature vectors for Courier.

In some embodiments, the font-map-creation system 102 identifies multiple feature vectors that correspond to a single node of the font map underlying the font-map visualization 302. For example, the font-map-creation system 102 identifies a particular node whose node weights have the smallest distance from multiple feature vectors. Thus, in some cases, the font-map-creation system 102 maps multiple feature vectors (and corresponding fonts) to a single node of the font map underlying the font-map visualization 302. In other cases, the font-map-creation system 102 maps a single feature vector to a single node of the font map underlying the font-map visualization 302 or else maps no feature vector to certain nodes of the font map (depending on their respective distances).

Figure 4A:
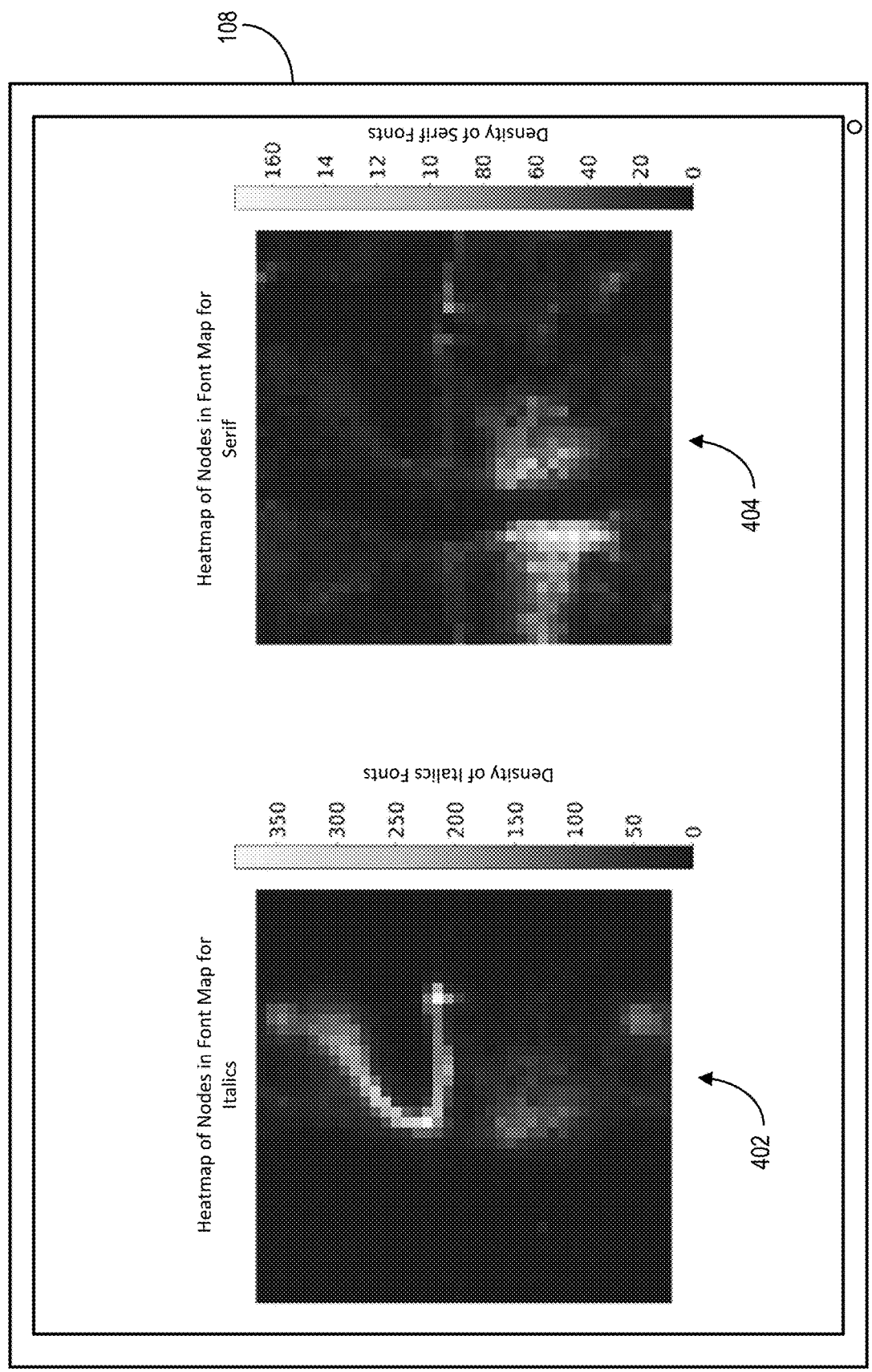
FIGS. 4A-4B illustrate heatmaps depicting densities of fonts with particular visual characteristics in a font map in accordance with one or more embodiments.
Figure 4B:
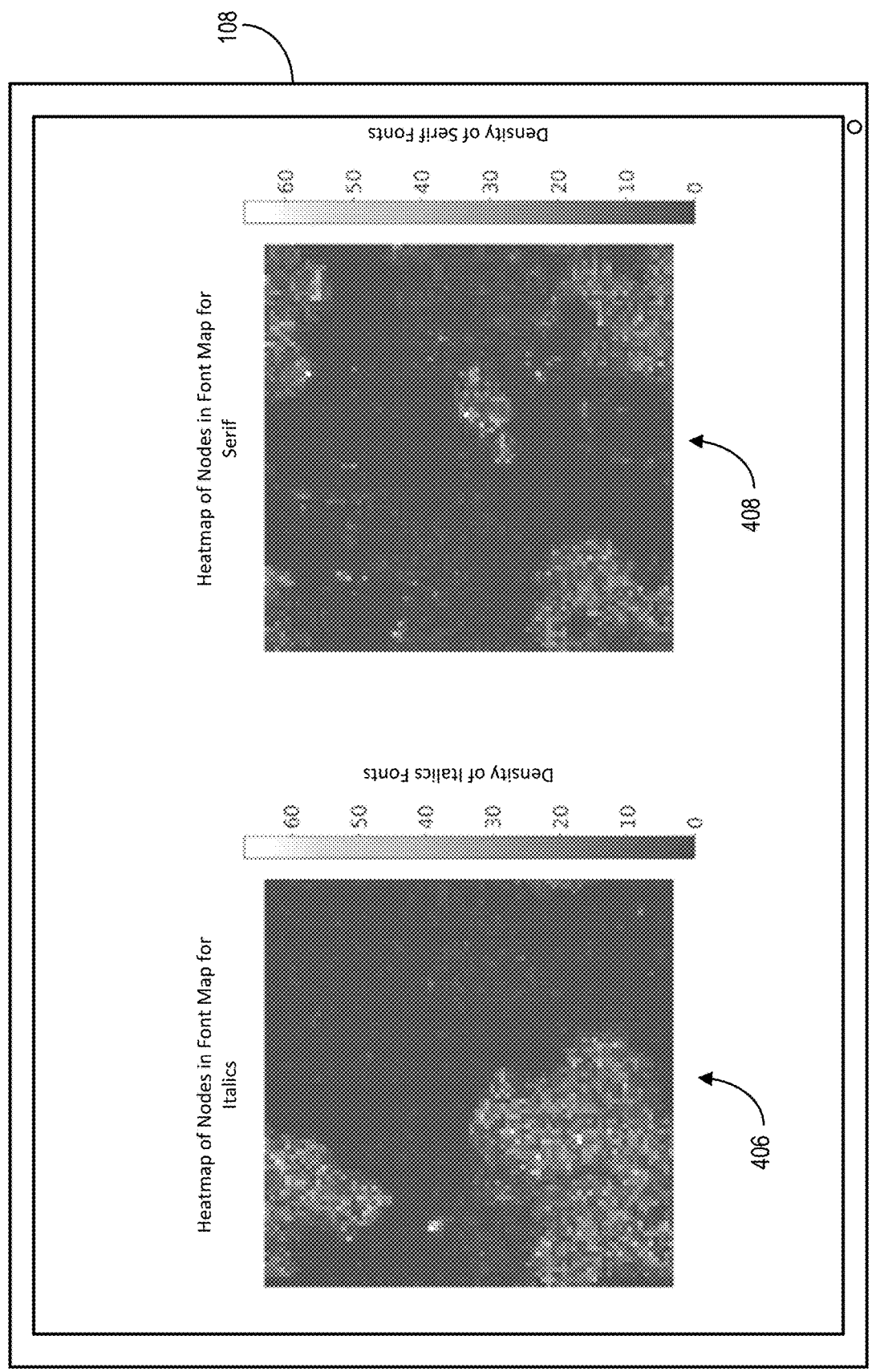

As mentioned, in certain implementations, the font-map-creation system 102 generates a font map that arranges feature vectors such that the fonts corresponding to the feature vectors are grouped according to visual similarities. FIGS. 4A-4B illustrate the client device 108 displaying heatmaps that depict the distribution of italics fonts and serif fonts, respectively, within a font map, in accordance with one or more embodiments. The heatmaps of FIG. 4A depict distributions of feature vectors (or fonts) for a lower-resolution font map (e.g., the font map corresponding to the font-map visualization 302), while the heatmaps of FIG. 4B depict distributions of feature vectors (or fonts) for a higher-resolution font map. Although FIGS. 4A-4B illustrate particular heatmaps corresponding to specific font maps, this is not necessarily an illustration of a best or an ideal font map. Indeed, in some embodiments, the font-map-creation system 102 generates font maps with different arrangements (sometimes even in different instances of processing the same data) in accordance with utilizing self-organizing maps or other visual-feature-classification models.

As illustrated in FIG. 4A, the italics heatmap 402 (entitled "Heatmap of Nodes in Font Map for Italics" in FIG. 4A) includes cells that vary in shade from dark to light. Likewise, the serif heatmap 404 (entitled "Heatmap of Nodes in Font Map for Serif" in FIG. 4A) also includes cells that vary in shade from dark to light. The cells in the italics heatmap 402 and the serif heatmap 404 represent one or more nodes of a font map (e.g., the font map corresponding to the font-map visualization 302), where the number of nodes represented by each cell depends on the resolution of the font map as well as the resolutions of the respective heatmaps. Additionally, the varying shades in the italics heatmap 402 and the serif heatmap 404 represent different densities of fonts that carry or depict a particular attribute in the corresponding locations of the font map.

For example, the italics heatmap 402 illustrates the distribution of fonts within the font map that are italicized (labeled on the shade scale as "Density of Italics Fonts" in FIG. 4A), while the serif heatmap 404 illustrates the distribution of fonts within the font map that are serif (labeled on the shade scale as "Density of Serif Fonts" in FIG. 4A). As indicated by the shade scales, lighter shades indicate areas of the font map with higher densities of fonts with the corresponding visual characteristic, while darker shades indicate areas of the font map with lower densities of fonts with the visual characteristic. Thus, cells with lighter shades in the italics heatmap 402 indicate areas or nodes of the font map with higher concentrations of italicized fonts. Likewise, cells with lighter shades in the serif heatmap 404 indicates areas or nodes the font map with higher concentrations of serif fonts.

In some embodiments, to generate a visual depiction of one or more fonts for display on the client device 108, the font-map-consumption system 103 selects fonts from a font map based on the distribution of fonts with a particular visual characteristic. For example, the font-map-consumption system 103 selects italic fonts to provide for display within a visual depiction (e.g., based on user input requesting italic fonts or a font similar to another italic font). To select italic fonts from the font map, in some cases, the font-map-consumption system 103 identifies fonts within areas of the font map that have higher densities or higher concentrations of italic fonts, as indicated by the italics heatmap 402 (e.g., by selecting nodes within areas of the font map corresponding to the "c"-shaped curve of lighter shades shown in the italics heatmap 402). Additional detail regarding selecting fonts to include within a visual depiction is provided below with reference to subsequent figures.

While FIG. 4A illustrates two example visual attributes or characteristics that the font-map-creation system 102 can model with a font map (e.g., italics and serif), the font-map-creation system 102 can map, identify, and determine the distributions of, fonts based on other visual characteristics as well. For example, the font-map-creation system 102 can determine distributions within a font map of bold fonts, light fonts, script fonts, and/or condensed fonts. Each different visual characteristic has its own distribution within a font map, and the font-map-creation system 102 thus generates a different heatmap for each one (e.g., for each feature).

As mentioned, in some embodiments, the font-map-creation system 102 generates higher-resolution font maps. In particular, the font-map-creation system 102 generates a higher-resolution font map that blows up or represents all or a portion of a lower-resolution font map in greater detail, including fonts mapped to additional nodes for finer transitions between font styles. Additionally (or alternatively), the font-map-creation system 102 generates a higher-resolution font map based on the same data as a lower-resolution font map but that is trained independently of the lower-resolution font map (and therefore has no direct correspondence with the lower-resolution font map). FIG. 4B illustrates heatmaps for a higher-resolution font maps in accordance with one or more embodiments.

As shown in FIG. 4B, an italics heatmap 406 is trained on the same data for fonts as the italics heatmap 402 of FIG. 4A. More specifically, the italics heatmap 406 represents a distribution of italic fonts within a higher-resolution font map trained on the same font data as the lower-resolution font map represented by the italics heatmap 402. Similarly, a serif heatmap 408 shown in FIG. 4B corresponds to the serif heatmap 404 of FIG. 4A and represents a distribution of serif fonts within a higher-resolution font map trained on the same font data as the lower-resolution font map represented by the serif heatmap 404. Thus, the serif heatmap 408 represents a distribution of serif fonts within the higher-resolution heat map that is generated using the same set of fonts as the lower-resolution heat map represented by the serif heatmap 404. Indeed, because the italics heatmap 406 and the serif heatmap 408 represent a higher-resolution font map, the font maps corresponding to the italics heatmap 406 and the serif heatmap 408 of FIG. 4B include smaller cells at a finer level of detail compared to those of the font maps corresponding to the italics heatmap 402 and the serif heatmap 404 of FIG. 4A.

Similar to the discussion above regarding FIG. 4A, the varying shades of cells within the italics heatmap 406 and the serif heatmap 408 represent different densities of fonts within the font map having the respective visual characteristics. Lighter shades indicate areas of the higher-resolution font map with higher densities or higher concentrations, while darker shades indicate areas of the higher-resolution font map with lower densities or lower concentrations.

In some embodiments, the font-map-consumption system 103 selects one or more fonts from a higher-resolution font map to include within a visual depiction of fonts for display on the client device 108. To select fonts from a higher-resolution font map, the font-map-consumption system 103 identifies areas of a higher-resolution font map that include fonts that have a particular visual characteristic (e.g., based on user input selecting or requesting fonts with the visual characteristic or fonts similar to another font). For example, the font-map-consumption system 103 selects a portion of (e.g., one or more nodes from) a higher-resolution font map that corresponds to the areas of the italics heatmap 406 with lighter-shaded cells. As another example, the font-map-consumption system 103 selects a portion of (e.g., one or more nodes from) a higher-resolution font map that corresponds to the areas of the serif heatmap 408 with lighter-shaded cells.

Figure 5:
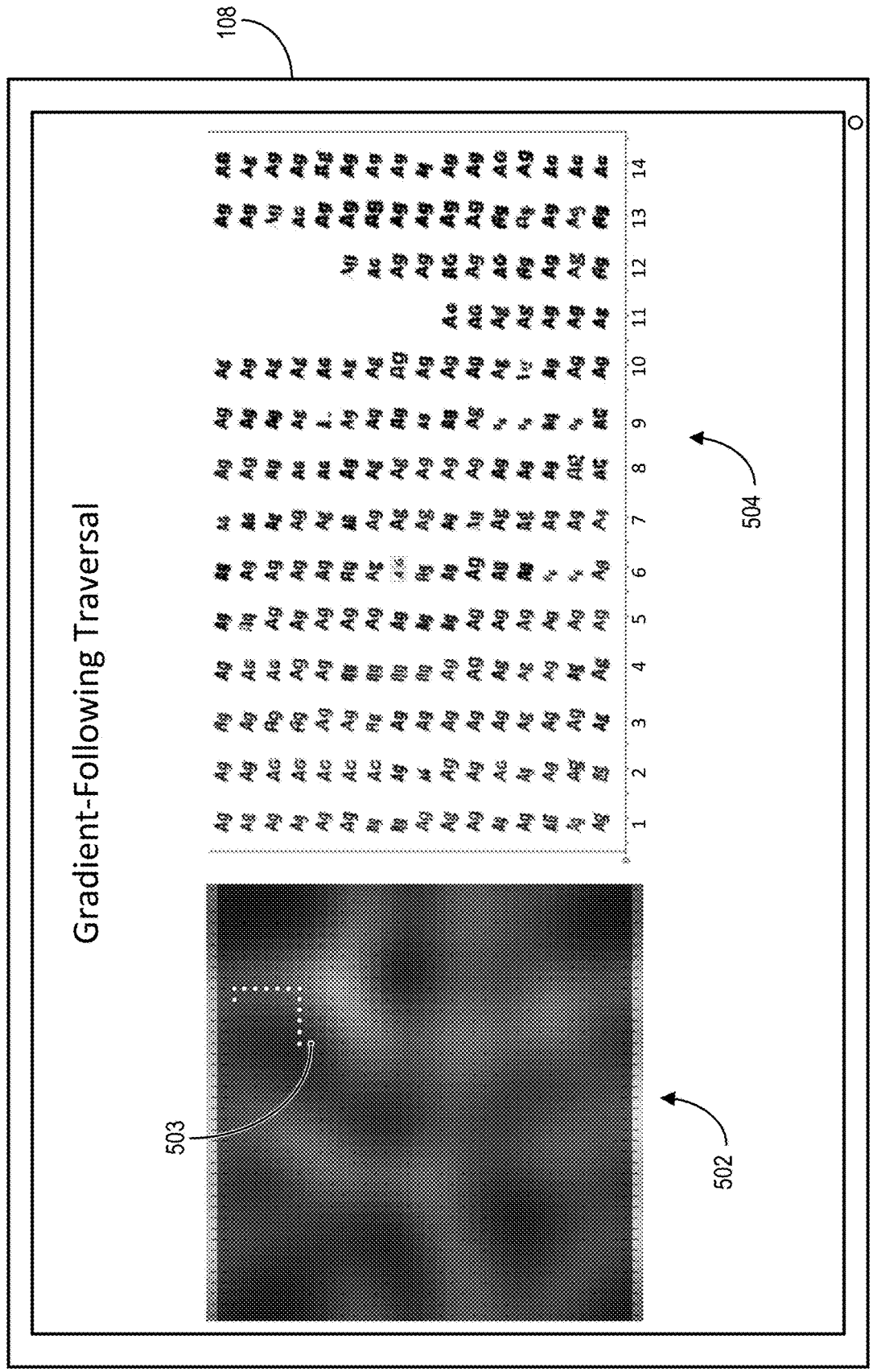
FIG. 5 illustrates a font-map-consumption system traversing a font map following a gradient in accordance with one or more embodiments.

As mentioned above, in some embodiments, the font-map-consumption system 103 selects fonts corresponding to feature vectors within a font map to include within a visual depiction. In particular, the font-map-consumption system 103 selects fonts by selecting nodes or feature vectors within a font map or by traversing the font map using a particular traversal technique. For example, the font-map-consumption system 103 traverses a font map to identify fonts that transition smoothly in visual appearance from one selected font to the next. Indeed, the font-map-consumption system 103 can traverse a font map to identify, recommend, and/or provide fonts visually similar to a user-selected font. As an example, based on user selection of a font from a lower-resolution font map, the font-map-consumption system 103 can traverse a higher-resolution font map to provide a set of similar fonts with finer differences between them for increased precision. FIG. 5 illustrates traversing a font map utilizing a gradient-following technique to generate a visual depiction 504 in accordance with one or more embodiments.

As illustrated in FIG. 5, in some embodiments, the font-map-consumption system 103 traverses the font map by following a gradient of a u-matrix 502 corresponding to the font map. In particular, the font-map-consumption system 103 follows a gradient of the u-matrix 502 by identifying a starting position or a starting node and iteratively selecting subsequent nodes one after the other. The font-map-consumption system 103 sequentially selects nodes by comparing u-matrix values for nodes around a current node and selecting a subsequent node as the node corresponding to a lowest u-matrix value (or a next u-matrix value along the gradient). By following the u-matrix gradient in this way, the font-map-consumption system 103 selects nodes for fonts that show smooth transitions in visual appearance.

As shown in FIG. 5, for instance, the font-map-consumption system 103 selects a starting node 503. In particular, the font-map-consumption system 103 selects the starting node 503 based on user input selecting a particular font corresponding to the starting node (e.g., within a lower-resolution font map or a higher-resolution font map). From the starting node 503, the font-map-consumption system 103 progresses along the path shown in FIG. 5, where each white dot along the path represents a sequentially selected node of the font map.

As illustrated in FIG. 5, the client device 108 also presents a visual depiction 504 of fonts selected via the gradient-following traversal. In particular, the visual depiction 504 depicts fonts mapped to nodes for each selection or step of the traversal process. For example, the font-map-consumption system 103 maps a number of fonts to the starting node 503, including all of those fonts in the first column (labeled "1") of the visual depiction 504. Following the gradient of the u-matrix 502, the font-map-consumption system 103 subsequently selects the next node to which a number of fonts are mapped, as represented by the fonts in the second column ("2"). The font-map-consumption system 103 continues to traverse the font map by following the gradient of the u-matrix 502 to select nodes for smooth transitions between font styles. Thus, the visual depiction 504 depicts smooth transitions across the fourteen different selected nodes, where fonts in selected nodes that are closer together are more visually similar to each other and fonts in selected nodes that are farther apart are less visually similar. Indeed, the fonts shown in the visual depiction 504 start out relatively light in the first few columns and get progressively bolder with each subsequent selection of the traversal until the fourteenth column where the fonts are the boldest.

Figure 6:
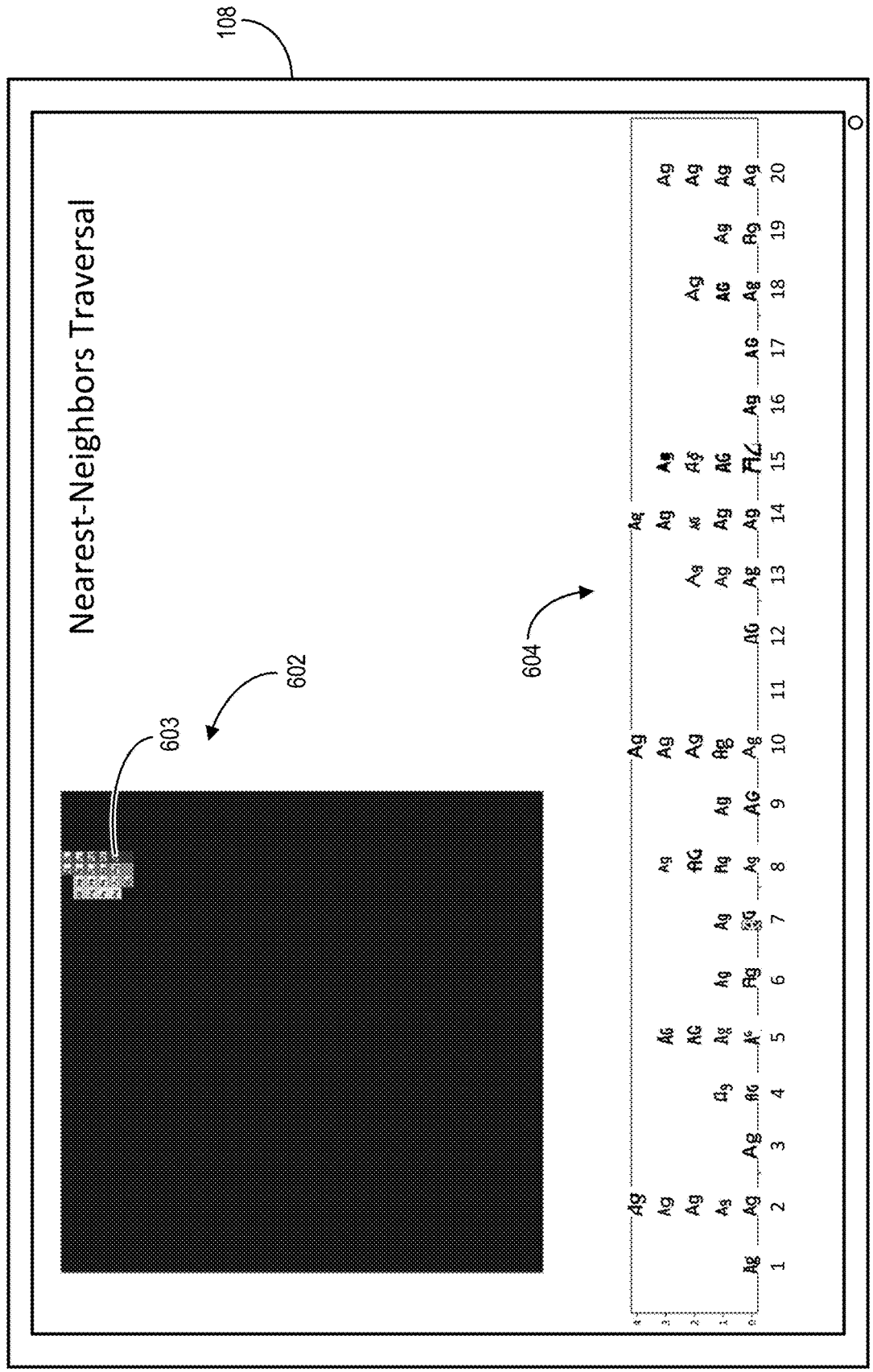
FIG. 6 illustrates a font-map-consumption system traversing a font map using nearest neighbors in accordance with one or more embodiments.

As mentioned, in some embodiments, the font-map-consumption system 103 implements different traversal techniques for finding or selecting fonts from a font map other than following a gradient of a u-matrix. For example, the font-map-consumption system 103 utilizes a nearest-neighbors traversal method or can traverse along cardinal directions of the font map. FIG. 6 illustrates a nearest-neighbors traversal in accordance with one or more embodiments. As shown in FIG. 6, the client device 108 displays a font map 602 and a visual depiction 604 of fonts selected as a result of traversing the font map 602 based on a nearest-neighbors algorithm.

As illustrated in FIG. 6, the font-map-consumption system 103 identifies a starting node within the font map 602 and subsequently selects nearest-neighbor nodes from the font map 602 in a sequence. For instance, the font-map-consumption system 103 identifies a starting node 603 as a node corresponding to a font selected by a user from a lower-resolution font map. From the starting node 603, the font-map-consumption system 103 traverses the font map 602 to identify a nearest-neighbor node in relation to the starting node 603. From the nearest-neighbor node, the font-map-consumption system 103 selects another nearest-neighbor node in relation to the first nearest-neighbor node and repeats the process by iteratively selecting nearest neighbor nodes, one after the other.

To identify a nearest-neighbor node, the font-map-consumption system 103 identifies a neighborhood of nodes associated with a current node (e.g., the starting node 603 or a subsequently selected node) and selects a neighbor node from the neighborhood. For example, the font-map-consumption system 103 identifies a neighborhood as an area of the font map 602 that includes nodes that are all within a threshold distance from the starting node 603 in feature space (or map space). In addition, the font-map-consumption system 103 visits all neighbor nodes in the map space and compares distances of the neighbor nodes from the starting node 603 to identify a nearest-neighbor node. More specifically, the font-map-consumption system 103 identifies a nearest-neighbor node as a node with node weights having a smallest distance from node weights of the starting node 603 in feature space (or map space).

By traversing the font map 602 and selecting nearest-neighbor nodes, the font-map-consumption system 103 selects nodes with fonts to include within the visual depiction 604. In particular, the font-map-consumption system 103 generates and provides the visual depiction 604 that includes twenty columns, one for each node selected in the nearest-neighbors traversal. As shown, the columns in the visual depiction 604 include different numbers of fonts that are mapped to them. For example, the first column (labeled "1") in the visual depiction 604 corresponds to the starting node 603 and includes only a single font. The nearest-neighbor node selected after the starting node 603 is represented by the second column ("2") and includes five fonts.

Thereafter, the remaining columns of the visual depiction 604 represent the sequentially selected nodes of the font map 602, selected one after the other, where the number of fonts in each column reflects the number of fonts in each respective node, ranging from zero fonts (e.g., the eleventh column) to five fonts.

Figure 7:
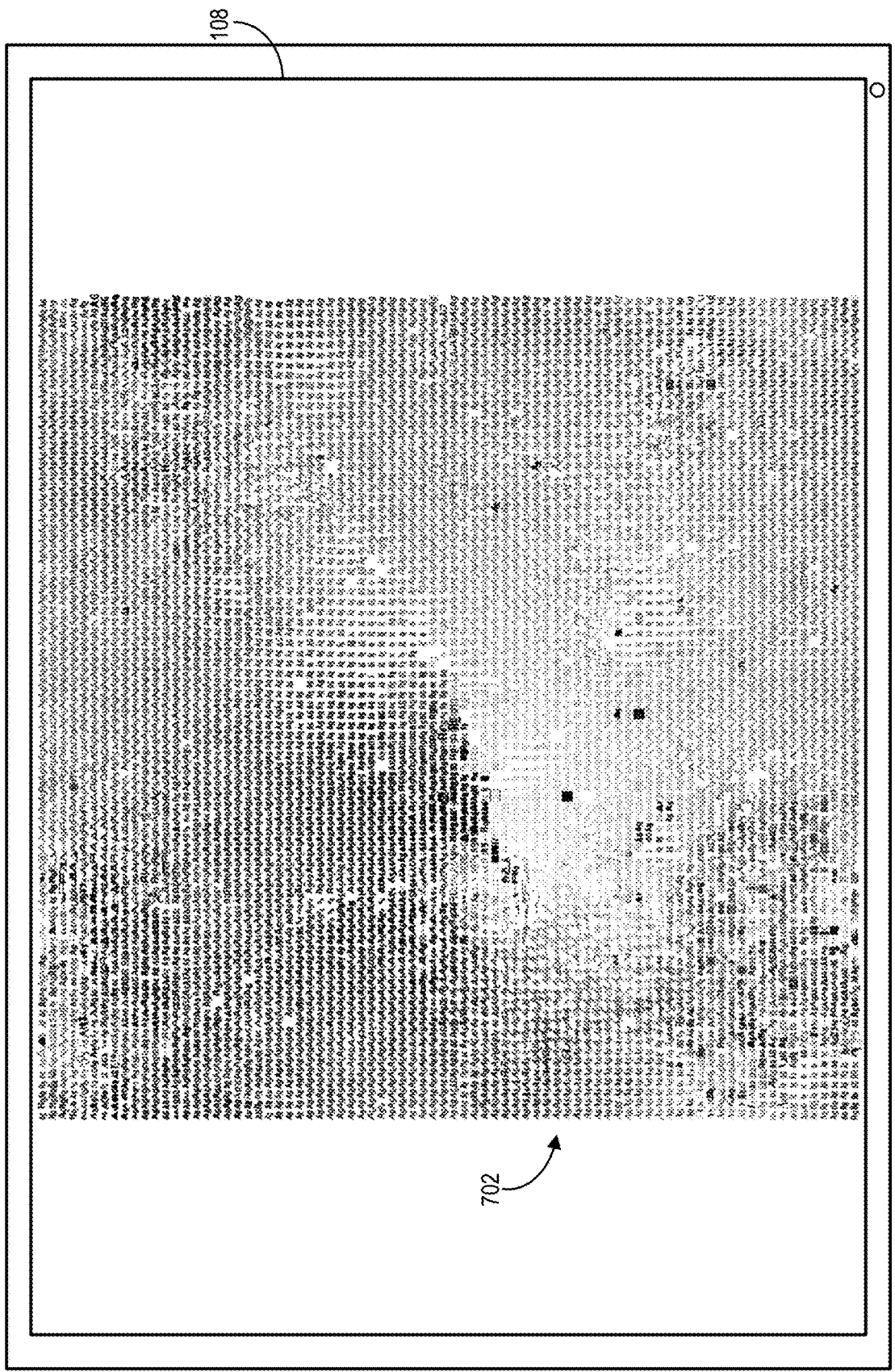
FIG. 7 illustrates a higher-resolution font map in accordance with one or more embodiments.

As mentioned, in certain embodiments, the font-map-creation system 102 generates higher-resolution font maps. In particular, the font-map-creation system 102 generates higher-resolution font maps that provide the arrangement of fonts for a target area of a lower-resolution font map at a more detailed (e.g., zoomed-in) level. FIG. 7 illustrates a font-map visualization 702 of a higher-resolution font map in accordance with one or more embodiments.

As illustrated in FIG. 7, the client device 108 displays the font-map visualization 702. Similar to the discussion above in relation to the font-map visualization 302 of FIG. 3 (which can be referred to as a lower-resolution font map), the font-map visualization 702 is a depiction of a font map for discussion purposes, where fonts are arranged in locations to represent nodes of a higher-resolution font map. Indeed, the actual font map for the font-map visualization 702 is an arrangement of node weights and/or font-feature vectors at various node locations which may not be discernible to a human observer.

As shown in FIG. 7, the font-map visualization 702 includes fonts at a greater level of detail than the font map corresponding to the font-map visualization 302 of FIG. 3. As a result, the visual difference between neighboring fonts in the font-map visualization 702 is less than the visual difference between fonts in the font map corresponding to the font-map visualization 302, therefore providing a greater level of granularity for more precise font selection. In some embodiments, the font-map-creation system 102 utilizes a different self-organizing map to generate the font map corresponding to the font-map visualization 702 than for generating a lower-resolution font map. Indeed, the font-map-creation system 102 utilizes a self-organizing map trained using a first training method to generate a lower-resolution font map and utilizes a self-organizing map trained using a second training method to generate the font map corresponding to the font-map visualization 702. Additional detail regarding the different methods to train or tune a self-organizing map or other visual-feature-classification model is provided below with reference to FIG. 9.

Based on the font-map visualization 702, the font-map-consumption system 103 provides options for a user to select fonts at more precise levels according to visual characteristics by first providing a visual depiction of fonts from a lower-resolution font map and subsequently providing a visual depiction of fonts from the font-map visualization 702. For example, in some embodiments, the font-map-consumption system 103 provides a visual depiction of fonts from the font-map visualization 702 based on, or in response to, the user interaction selecting a font from the lower-resolution font map.

As mentioned above, in some embodiments, the font-map-creation system 102 generates an adaptive-resolution font map that includes areas of different resolutions. Particularly, in some cases, the font-map-creation system 102 automatically (e.g., without requiring user input) determines or identifies target areas of a font map for which to increase resolution to include additional fonts at a more granular level of detail. To elaborate, in certain implementations, the font-map-creation system 102 identifies areas of the font map with u-matrix values that exceed a u-matrix-value threshold and/or with data variance (e.g., variance between feature vectors) inside each node that exceed a variance threshold. The font-map-creation system 102 thus increases the resolution of these target areas. In some embodiments, the font-map-creation system 102 identifies the areas for which to increase the target areas based on user input. For instance, the font-map-creation system 102 identifies a target area as an area defined by a particular number of nodes above and/or below a node corresponding to a selected font and to the right and/or left of a node corresponding to the selected font.

In some embodiments, the font-map-consumption system 103 generates the font-map visualization 702 (e.g., for a target area) in response to an indication of user selection of a font within a lower-resolution font map. For example, in some cases, the font-map-consumption system 103 generates the font-map visualization 702 based on fixed boundary conditions. To elaborate, the font-map-consumption system 103 fixes (or causes the font-map-creation system 102 to fix) boundary conditions for a target area of a font map by identifying nodes within the font map that are within (or that define) that target area. Based on identifying the nodes within the target area, the font-map-consumption system 103 (or the font-map-creation system 102) interpolates between the node weights of those nodes to generate new node weights for new nodes to include within the font-map visualization 702.

Figure 8:
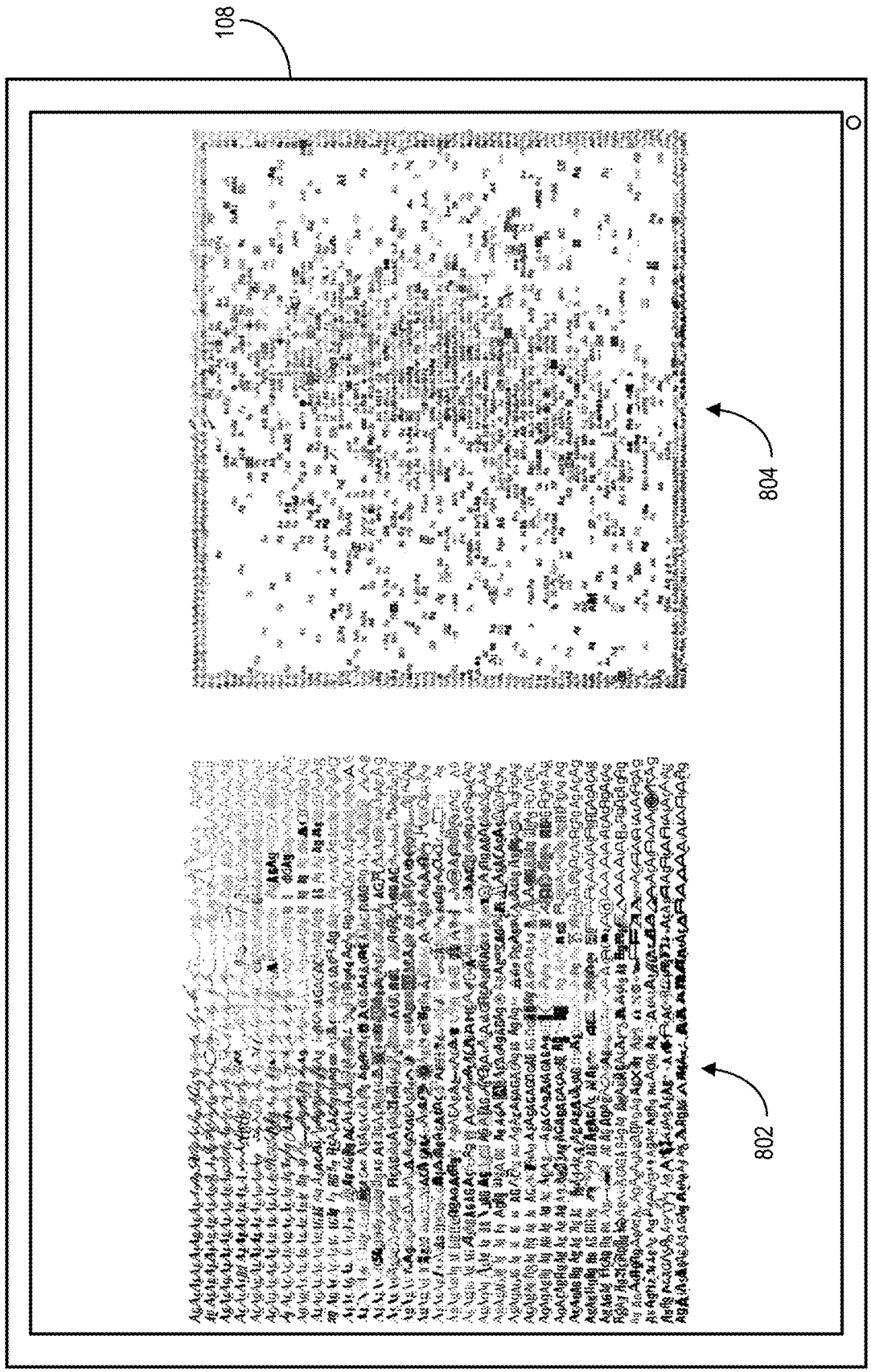
FIG. 8 illustrates a higher-resolution font map with fixed boundary conditions in accordance with one or more embodiments.

As mentioned above, in some embodiments, the font-map-creation system 102 fixes boundary conditions of a target area to generate a higher-resolution font map (e.g., a higher-resolution font map corresponding to the font-map visualization 702). In particular, the font-map-creation system 102 fixes boundary conditions by identifying nodes within a target area of a lower-resolution font map (e.g., the font map corresponding to the font-map visualization 302) and interpolating between node weights corresponding to the identified nodes. FIG. 8 illustrates a font-map visualization 804 of a higher-resolution font map generated with fixed boundaries for a target area of a lower-resolution font map represented by a font-map visualization 802 in accordance with one or more embodiments.

As illustrated in FIG. 8, the font-map visualization 804 is incomplete (with gaps between fonts) because training has not yet converged for the corresponding self-organizing map. However, for discussion purposes, the font map corresponding to the font-map visualization 804 includes fonts of a target area of the font map corresponding to the font-map visualization 802 at a greater level of detail, with more fonts that have slighter visual differences between fonts that are adjacent to each other. In some embodiments, a target area can include a portion less than an entire area (or volume) of the font map corresponding to the font-map visualization 802, while in other embodiments a target area can include an entire area (or volume) of the font map corresponding to the font-map visualization 802. For discussion purposes, the font-map visualization 804 can be an incomplete version of the font-map visualization 702.

To generate the higher-resolution font map, the font-map-creation system 102 interpolates between node weights of nodes within a target area of the lower-resolution font map. More specifically, the font-map-creation system 102 identifies nodes of the lower-resolution font map that are within the target area and that make up the boundary of the target area. In addition, the font-map-creation system 102 interpolates between the node weights of the identified nodes to generate new nodes with new node weights to include within the higher-resolution font map.

As indicated above, in some embodiments, the font-map-creation system 102 interpolates between node weights by determining a distance (in feature space or map space) between adjacent nodes in the target area. The font-map-creation system 102 further determines a number of new nodes to add between the adjacent nodes to fill the distance. For instance, the font-map-creation system 102 determines a number of additional nodes to add between adjacent nodes of a target area based on a ratio between the resolution of the target area and the resolution of the higher-resolution font map corresponding to the font-map visualization 804. In addition, the font-map-creation system 102 determines node weights for the number of new nodes to space (e.g., evenly space) the new nodes between the adjacent nodes of the target area in the map space.

In some embodiments, the font-map-creation system 102 does not generate new node weights to space the new nodes evenly, but instead generates new node weights based on the distribution of feature vectors within the target area to provide enhanced detail in areas with higher font densities (or higher feature-vector densities). Apart from the increased resolution, generating the higher-resolution font map allows the font-map-creation system 102 to re-project target areas according to their local feature vectors and/or local node weights, thereby improving the smoothness of transitions between fonts for navigating among visually similar fonts. For areas with uniform distributions, the font-map-creation system 102 further performs sub sampling where necessary.

In some embodiments, the font-map-creation system 102 generates an adaptive-resolution font map. In particular, the font-map-creation system 102 generates a font map with different resolutions in different areas. For instance, the font-map-creation system 102 identifies target areas of the lower-resolution font map corresponding to the font-map visualization 802 for which to generate higher-resolution font maps (such as the higher-resolution font map corresponding to the font-map visualization 804). Specifically, the font-map-creation system 102 identifies target areas by determining u-matrix values and data variance of the nodes of lower-resolution font map. The font-map-creation system 102 thus identifies target areas as areas with nodes that have u-matrix values that exceed a u-matrix-value threshold and/or that have data variance inside the nodes that exceeds a variance threshold. By generating higher-resolution font maps for these target areas, the font-map-creation system 102 inspects and navigates font-feature vectors in different scales to provide improved precision in font selection.

In one or more embodiments, the font-map-creation system 102 performs a step for constructing a font map arranging the plurality of fonts according to visual similarity. In particular, the font-map-creation system 102 utilizes particular acts and algorithms to implement or perform the step for constructing the font map. Specifically, the description above in relation to FIG. 2, including acts 204, 206, and 208, provides acts and algorithms as structure and support for performing a step for constructing a font map arranging the plurality of fonts according to visual similarity.

Figure 9:
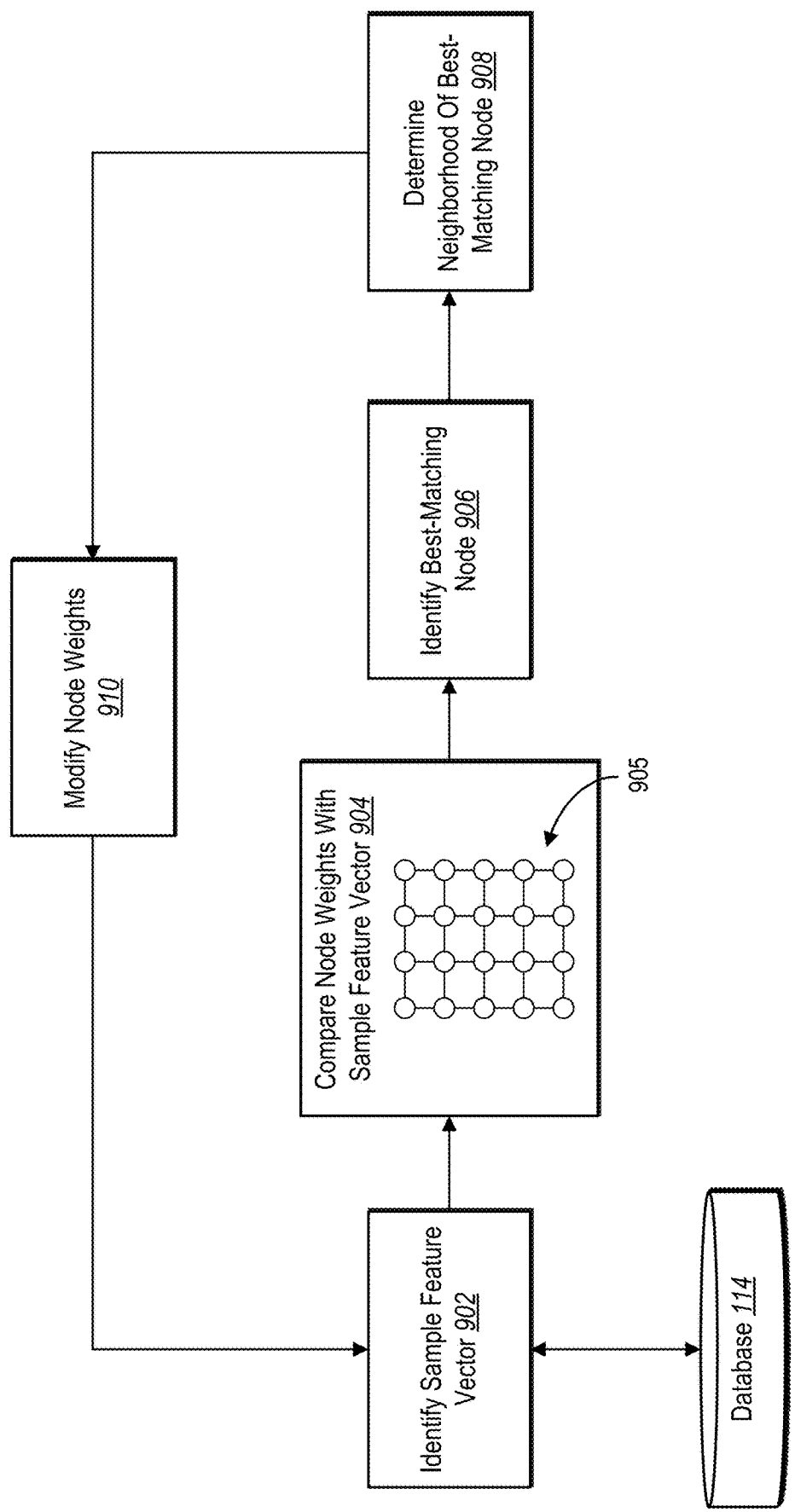
FIG. 9 illustrates a diagram for a font-map-creation system training or tuning a visual-feature-classification model in accordance with one or more embodiments.

As mentioned above, in certain embodiments, the font-map-creation system 102 trains or tunes a visual-feature-classification model to accurately map feature vectors for fonts. In particular, the font-map-creation system 102 trains a visual-feature-classification model in the form of a self-organizing map by inputting sample feature vectors representing sample fonts into self-organizing map and modifying node weights for nodes of the self-organizing map to more closely match input vectors. For example, due to the ability to project new data on a trained self-organizing map, the font-map-creation system 102 inputs a relatively small number of fonts (e.g., 10,000 fonts) to accelerate the training process over a particular number of iterations (e.g., 90,000 iterations), while still being able to project an entire dataset on the resulting trained self-organizing map. FIG. 9 illustrates training or tuning a self-organizing map 905 in accordance with one or more embodiments. In some embodiments, the same training or tuning apply to other visual-feature-classification models.

As illustrated in FIG. 9, the font-map-creation system 102 performs an act 902 to identify a sample feature vector representing a sample font (e.g., a training font-feature vector). In particular, in certain implementations, the font-map-creation system 102 accesses the database 114 to identify a stored sample feature vector to input into the self-organizing map 905. In some embodiments, the font-map-creation system 102 randomly selects a sample feature vector from a set of sample feature vectors used for training or tuning self-organizing maps. The font-map-creation system 102 selects the sample feature vector and inputs the vector into the self-organizing map 905. For training to generate font maps with periodic boundary conditions, the self-organizing map 905 can be a two-dimensional toroid map having dimensions of 80×80 nodes. For training to generate font maps with fixed boundary conditions, on the other hand, the self-organizing map 905 can be a two-dimensional planar map (e.g., having dimensions of 80×80 nodes).

In addition, after initializing the node weights of the self-organizing map 905, the font-map-creation system 102 performs an act 904 to compare the node weights with the sample feature vector representing a sample font. More specifically, the font-map-creation system 102 compares node weights for each node of the self-organizing map 905 with the sample feature vector. To compare the input sample feature vector with node weights, the font-map-creation system 102 determines distances (e.g., Euclidean distances) between the sample feature vector and the node weights. Through the comparison, the font-map-creation system 102 determines which node of the self-organizing map 905 is the closest to the input sample feature vector (e.g., which node has node weights that most closely resemble the sample feature vector).

As further shown in FIG. 9, the font-map-creation system 102 performs an act 906 to identify the best-matching node (or the best-matching unit). Particularly, the font-map-creation system 102 identifies the best-matching node as the node within the self-organizing map 905 that is the closest, or whose weights have the smallest difference (or distance) from the sample feature vector representing a sample font.

In some embodiments, to achieve more uniform density across the self-organizing map 905, the font-map-creation system 102 identifies a best-matching node by prioritizing nodes with high u-matrix values (e.g., u-matrix values that exceed a u-matrix-value threshold). For instance, the font-map-creation system 102 emphasizes or weights areas of the self-organizing map 905 that include nodes with high u-matrix values to focus training more on these areas (e.g., by increasing the likelihood of identifying a best-matching node in these areas). To emphasize these areas, the font-map-creation system 102 generates (e.g., as part of the act 904) a modified training map by artificially adjusting the node weights of nodes with high u-matrix values to make these nodes more closely resemble the sample feature vector, thus increasing their likelihood of being selecting as the best-matching node. In some embodiments, the font-mapcreation system 102 only uses the modified training map during training or tuning the self-organizing map 905.

Additionally, in certain implementations, the font-map-creation system 102 starts the scale of artificially modifying the node weights of high-u-matrix-value nodes at zero to allow meaningful concentrations to form and increases as training progresses through subsequent iterations (to smoothen the transitions between different concentrations) until reaching a maximum scale value. By training more around the areas of the self-organizing map 905 with nodes that have high u-matrix values, the font-map-creation system 102 thus decreases the u-matrix values through training (e.g., to minimize the gradient of the u-matrix while preserving the properties of self-organizing map 905) to thereby enhance or increase the uniformity of the self-organizing map 905. With a more uniform self-organizing map 905, the font-map-creation system 102 produces a more even distribution when mapping fonts during application.

Upon identifying the best-matching node, the font-map-creation system 102 further performs an act 908 to determine a neighborhood of the best-matching node. Indeed, in some embodiments, the self-organizing map 905 is an emergent self-organizing map where the font-map-creation system 102 modifies weights of neighboring nodes in addition to the best-matching node. In particular, the font-map-creation system 102 determines a neighborhood of nodes associated with the best-matching node by utilizing a neighborhood function. More specifically, the font-map-creation system 102 identifies a subset of nodes within the self-organizing map 905 that are neighbors of the best-matching node according to the neighborhood function (e.g., based on the topological distribution of the self-organizing map 905 and/or distances of nodes within the self-organizing map 905 from the best-matching node).

As further illustrated in FIG. 9, the font-map-creation system 102 performs an act 910 to modify node weights. To elaborate, in some cases, the font-map-creation system 102 modifies node weights of the best-matching node as well as the nodes in the neighborhood of the best-matching node to make the weights more like the sample feature vector representing a sample font. For example, the font-map-creation system 102 modifies the weights of the best-matching unit the most, and the font-map-creation system 102 modifies the weights of the neighboring nodes based on their respective distance from the best-matching node. The closer a neighboring node is to the best-matching node, the more the font-map-creation system 102 modifies its node weights, and the farther away a neighboring node is, the less the font-map-creation system 102 modifies its node weights.

In some embodiments, the font-map-creation system 102 updates or modifies node weights in accordance with the following function (for periodic boundaries or non-fixed-boundary conditions):

updated_weights=current_weights−gauss*lrate*(current_weights−inputVec), where inputVec represents the input sample feature vector representing a sample font, gauss represents the Gaussian of the Euclidean distance (in map space) of the current node and the best-matching node of the inputVec, and lrate represents the learning rate which decays as training progresses.

To train a self-organizing map for generating lower-resolution font maps, the font-map-creation system 102 can utilize a different training process than when training a self-organizing map for generating higher-resolution font maps. Indeed, for higher-resolution font maps, the font-map-creation system 102 preserves or fixes boundaries of the font map. Thus, during training for generating higher-resolution font maps, the font-map-creation system 102 utilizes a non-periodic boundary that is planar instead of toroidal (which is used in training for lower-resolution font maps with periodic boundaries). In addition, in some embodiments, the font-map-creation system 102 utilizes a restraint term (e.g., the boundary_distance term) to modify the learning rate for updating node weights such that the learning rate of nodes within the boundary (e.g., within a target area) is zero and the learning rate of the neighboring nodes increases as a function of their distance from the closest boundary until reaching a default value at distance d. The distance d is a hyperparameter that is tuned based on the size of the self-organizing map 905, the type and/or size of the training data (e.g., the sample feature vectors), and desired results.

For instance, the font-map-creation system 102 updates or modifies node weights for generating non-period-boundary font maps (e.g., with fixed boundary conditions) in accordance with the following function:

updated_weights=current_weights−boundary_distance*lrate*(current_weights−inputVec), where boundary_distance represents a scaled Euclidean distance (in map space) of the current node and a closest node that lies on the boundary of the self-organizing map 905 (and which is capped at value 1), and where the other terms as are defined above. The scaling helps the boundary_distance reach the max value of 1 at a pre-determined distance d from the boundary. The font-map-creation system 102 can utilize different scaling techniques, such as linear or Gaussian scaling.

The font-map-creation system 102 further repeats the training or tuning process illustrated in FIG. 9 for a particular number of iterations. Indeed, in some cases, the font-map-creation system 102 repeats the acts 902-910 as part of each iteration. Particularly, the font-map-creation system 102 identifies subsequent sample feature vectors representing subsequent sample fonts, compares the sample feature vectors with node weights, identifies a best-matching node, determines a neighborhood of the best-matching node, and modifies the node weights for each iteration. In some embodiments, the font-map-creation system 102 performs 90,000 iterations of training selecting from 10,000 different sample feature vectors. Additionally, or alternatively, the font-map-creation system 102 performs training iterations until the node weights of the self-organizing map 905 do not change significantly across training iterations or otherwise satisfy a convergence criteria.

As mentioned above, in some embodiments, the font-map-creation system 102 utilizes different types visual-feature-classification models. For example, the font-map-creation system 102 utilizes a self-organizing map, as described in detail above. In addition (or alternatively) to the self-organizing map, the font-map-creation system 102 can utilize a visual-feature-classification model in the form of a PCA model or a t-SNE model. FIG. 10 illustrates a font-map visualization 1002 of a font map generated using a PCA model and a font-map visualization 1004 of a font map generated using a t-SNE model in accordance with one or more embodiments.

As illustrated in FIG. 10, the font-map visualization 1002 and the font-map visualization 1004 represent fonts maps that include arrangements of feature vectors corresponding to the depicted fonts at their respective locations. In some embodiments, the font-map visualization 1002 and the font-map visualization 1004 represent three-dimensional font maps that are rotatable. Indeed, the font-map-consumption system 103 can provide visual depictions of fonts from the font-map visualization 1002 or the font-map visualization 1004 (or a font map generated using a self-organizing map) for display on the client device 108, along with selectable controls to rotate and navigate the font map.

While the font-map visualization 1002 and the font-map visualization 1004 represent font maps that include feature vectors mapped based on visual similarities between fonts, the algorithms for PCA and t-SNE are sometimes not as accurate as a self-organizing map in mapping font-feature vectors. Indeed, the PCA and t-SNE are sometimes less able to account for noise (or sometimes introduce noise) to data such as font-feature vectors than the self-organizing map. Additionally, the PCA and t-SNE are sometimes less accurate than the self-organizing map when it comes to finer, more nuanced details between fonts. For example, font-map-creation system 102 can implement a PCA model to generate compact and uniform font maps, but sometimes these font maps (e.g., the font map underlying the font-map visualization 1002) include too much stylistic variation among nearby fonts. Conversely, the font-map-creation system 102 can implement a t-SNE model to generate font maps (e.g., the font map underlying the font-map visualization 1004) that have better local similarity, but at the expense of uniformity—the font map underlying the font-map visualization 1004 is less uniform and includes large sparse regions.

While this disclosure refers, in certain locations, to the font-map-creation system 102 and the font-map-consumption system 103, in some embodiments, the font-map-creation system 102 and the font-map-consumption system 103 are part of a single system. Indeed, the font-map-creation system 102 and the font-map-consumption system 103 are constituent subsystems of a font map system 105. Thus, in embodiments described herein, the font map system 105 performs the actions and functions of the font-map-creation system 102 and the font-map-consumption system 103 described herein.

Figure 11:
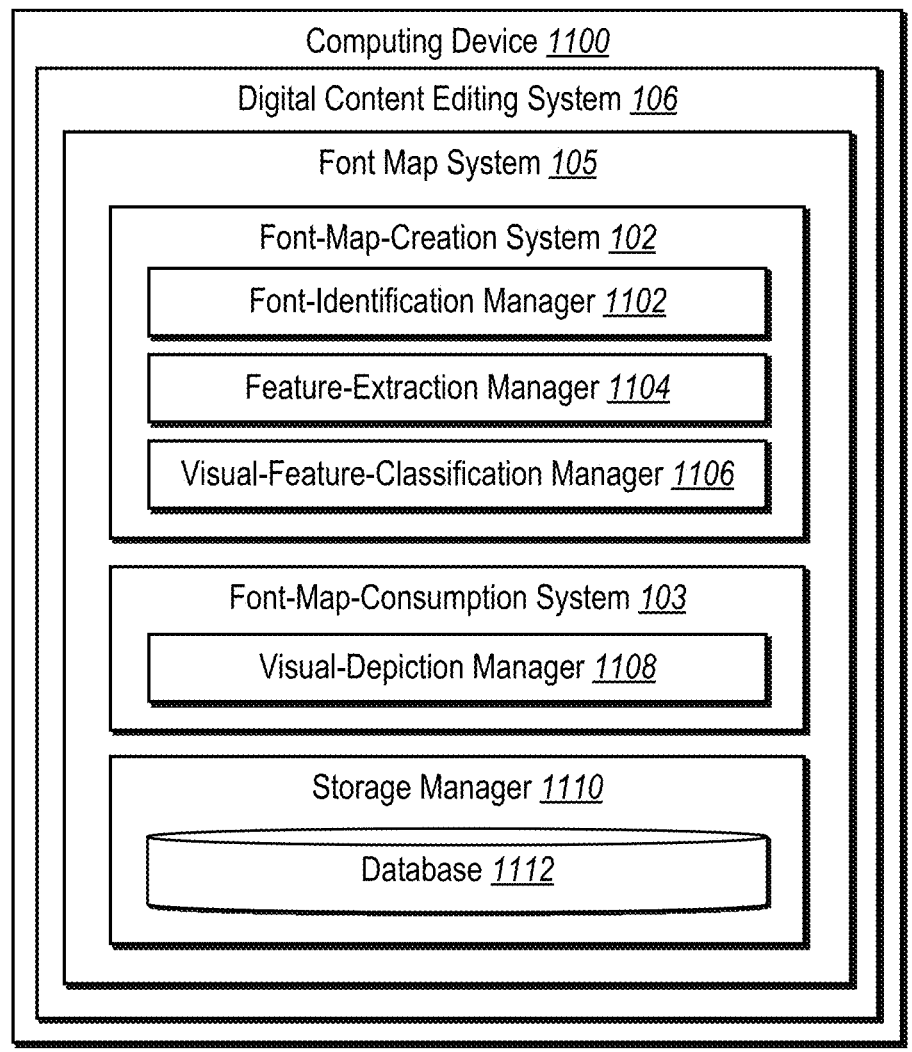
FIG. 11 illustrates a schematic diagram of a font map system in accordance with one or more embodiments.

Looking now to FIG. 11, additional detail will be provided regarding components and capabilities of the font-map-creation system 102 and the font-map-consumption system 103. Specifically, FIG. 11 illustrates an example schematic diagram of the font map system 105 (which includes the font-map-creation system 102 and the font-map-consumption system 103) on an example computing device 1100 (e.g., one or more of the client device 108 and/or the server(s) 104). As shown in FIG. 11, the font-map-creation system 102 may include a font-identification manager 1102, a feature-extraction manager 1104, a visual-feature-classification manager 1106, a visual-presentation manager 1108, and a storage manager 1110. The storage manager 1110 can operate in conjunction with or include one or more memory devices such as the database 1112 (e.g., the database 114) that store various data such as algorithms for a self-organizing map, a PCA model, or a t-SNE model, an encoder neural network, as well as a plurality of font-feature vectors for fonts.

As just mentioned, the font-map-creation system 102 includes a font-identification manager 1102. In particular, the font-identification manager 1102 manages, maintains, detects, determines, or identifies fonts associated with a client device (e.g., the client device 108). For example, the font-identification manager 1102 accesses a database associated with the client device 108 and/or the client application 110 to identify fonts installed on the client device 108, accessible by the client application, or otherwise associated with the client device 108.

In addition, the font-map-creation system 102 includes a feature-extraction manager 1104. In particular, the feature-extraction manager 1104 manages, maintains, extracts, obtains, generates, or identifies features from fonts. For example, the feature-extraction manager 1104 utilizes an encoder neural network to extract fonts from features to represent the fonts as feature vectors, as described herein. Indeed, the feature-extraction manager 1104 generates a feature vector for each font identified for the client device 108.

As shown, the font-map-creation system 102 includes a visual-feature-classification manager 1106. In particular, the visual-feature-classification manager 1106 manages, maintains, determines, maps, plots, arranges, or identifies fonts based on visual similarities among the fonts. For example, the visual-feature-classification manager 1106 determines visual similarities among the fonts using a visual-feature-classification model, as described herein. In addition, the visual-feature-classification manager 1106 maps feature vectors for fonts to nodes of a self-organizing map to thereby arrange the feature vectors in according to visual similarity. Thus, the visual-feature-classification manager 1106 generates a font map of feature vectors mapped to nodes of the font map based on node weights, as described herein. Additionally, the visual-feature-classification manager 1106 generates lower-resolution font maps, higher-resolution font maps, and/or adaptive-resolution font maps, as further described herein. In some embodiments, the visual-feature-classification manager 1106 trains the self-organizing map to generate accurate font maps, as described.

As further shown, the font-map-consumption system 103 includes a visual-presentation manager 1108. In particular, the visual-presentation manager 1108 manages, maintains, arranges, provides, display, or generates a visual depiction of one or more fonts from a font map. For example, the visual-presentation manager 1108 generates a visual depiction by selecting fonts from a font map based on visual appearance. As described herein, the visual-presentation manager 1108 can traverse a font map to select fonts to include within a visual depiction such that the selected fonts have smooth transitions in visual appearance.

Additionally, the font-map-creation system 102 includes a storage manager 1110. In particular, the storage manager 1110 manages, maintains, stores, provides, receives, or transmits information for the various other components of the font-map-creation system 102. For example, the storage manager 1110 communicates with the feature-extraction manager 1104 to receive and store extracted feature vectors for fonts. In addition, the storage manager 1110 communicates with the visual-feature-classification manager 1106 to provide feature vectors for mapping to a font map.

In one or more embodiments, each of the components of the font map system 105 are in communication with one another using any suitable communication technologies. Additionally, the components of the font map system 105 can be in communication with one or more other devices including one or more client devices described above. It will be recognized that although the components of the font map system 105 are shown to be separate in FIG. 11, any of the subcomponents may be combined into fewer components, such as into a single component, or divided into more components as may serve a particular implementation. Furthermore, although the components of FIG. 11 are described in connection with the font map system 105, at least some of the components for performing operations in conjunction with the font map system 105 described herein may be implemented on other devices within the environment.

The components of the font map system 105 can include software, hardware, or both. For example, the components of the font map system 105 can include one or more instructions stored on a computer-readable storage medium and executable by processors of one or more computing devices (e.g., the computing device 1100). When executed by the one or more processors, the computer-executable instructions of the font map system 105 can cause the computing device 1100 to perform the methods described herein. Alternatively, the components of the font map system 105 can comprise hardware, such as a special purpose processing device to perform a certain function or group of functions. Additionally or alternatively, the components of the font map system 105 can include a combination of computer-executable instructions and hardware.

Furthermore, the components of the font map system 105 performing the functions described herein may, for example, be implemented as part of a stand-alone application, as a module of an application, as a plug-in for applications including content management applications, as a library function or functions that may be called by other applications, and/or as a cloud-computing model. Thus, the components of the font map system 105 may be implemented as part of a stand-alone application on a personal computing device or a mobile device. Alternatively or additionally, the components of the font map system 105 may be implemented in any application or collection of applications that allow creation and delivery of marketing content to users, including, but not limited to, an application, service, web-hosted application, or collection of applications from ADOBE EXPERIENCE MANAGER, ADOBE FONTS, and ADOBE CREATIVE CLOUD, such as ADOBE ILLUSTRATOR, ADOBE PHOTOSHOP, and ADOBE INDESIGN. "ADOBE," "ADOBE EXPERIENCE MANAGER," "ADOBE FONTS," "ADOBE CREATIVE CLOUD," "ADOBE ILLUSTRATOR," "ADOBE PHOTOSHOP," and "ADOBE INDESIGN" are trademarks of Adobe Inc. in the United States and/or other countries.

FIGS. 1-11, the corresponding text, and the examples provide a number of different systems, methods, and non-transitory computer readable media for generating font maps based on visual similarities to provide visual depictions of one or more fonts for selection. In addition to the foregoing, embodiments can also be described in terms of flowcharts comprising acts for accomplishing a particular result. For example, FIG. 12 illustrates a flowchart of an example sequence or series of acts in accordance with one or more embodiments.

Figure 12:
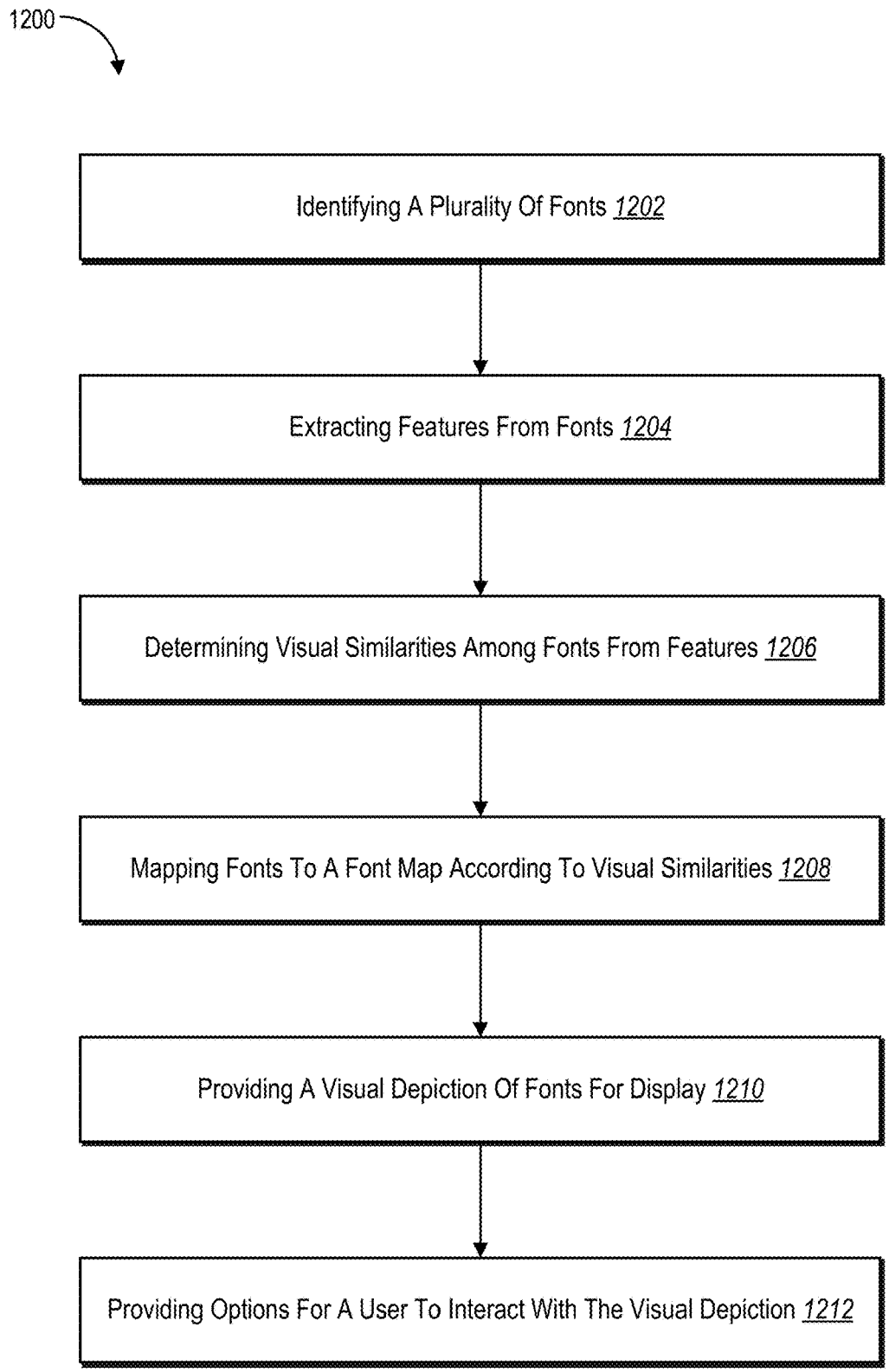
FIG. 12 illustrates a flowchart of a series of acts for generating font maps based on visual similarities to provide visual depictions of one or more fonts in accordance with one or more embodiments.

While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12. Additionally, the acts described herein may be repeated or performed in parallel with one another or in parallel with different instances of the same or other similar acts.

FIG. 12 illustrates an example series of acts 1200 of generating font maps based on visual similarities to provide visual depictions of one or more fonts for selection. In particular, the series of acts 1200 includes an act 1202 of identifying a plurality of fonts. For example, the act 1202 can involve identifying a plurality of fonts of varying styles associated with a client device. Further, the act 1202 can include identifying a plurality of font faces of varying styles or identifying a plurality of font families of varying styles.

As shown, the series of acts 1200 includes an act 1204 of extracting features from fonts. In particular, the act 1204 can involve extracting features from the plurality of fonts. For example, the act 1204 can involve extracting the features from the plurality of fonts by utilizing an encoder neural network to extract a subset of features from each font from the plurality of fonts.

Additionally, the series of acts 1200 includes an act 1206 of determining visual similarities among fonts from features. In particular, the act 1206 can involve determining, utilizing a visual-feature-classification model, visual similarities among the plurality of fonts from the features. For example, the act 1206 can involve determining distances between feature vectors corresponding to the plurality of fonts in a feature space. Indeed, the act 1206 can involve determining feature distances between feature vectors representing the plurality of fonts and node weights for a set of nodes within the font map.

Further, the series of acts 1200 includes an act 1208 of mapping fonts to a font map according to visual similarities. In particular, the act 1208 can involve mapping, utilizing the visual-feature-classification model, the plurality of fonts to a font map according to the visual similarities. For example, the act 1208 can involve mapping particular feature vectors representing visually similar fonts to a subset of nodes within the font map.

As further illustrated, the series of acts 1200 includes an act 1210 of providing a visual depiction of fonts for display. In particular, the act 1210 can involve providing, for display on the client device, a visual depiction of one or more fonts from the plurality of fonts based on the font map. For example, the act 1210 can involve traversing the font map to select a font having less than a threshold difference in visual appearance in relation to a previously selected font.

The series of acts 1200 can also include an act 1212 of providing options for a user to interact with the visual depiction. In particular, the act 1212 can involve providing, for display on the client device, options for a user to interact with the visual depiction. For instance, the act 1212 can include an act of identifying a target area of the font map. Further, the act 1212 can include an act of generating a higher-resolution font map for the target area by mapping a subset of fonts to a subset of nodes of the higher-resolution font map. Generating the higher-resolution font map can involve fixing a boundary condition for the higher-resolution font map based on a boundary associated with the target area and generating new node weights for new nodes within the target area by interpolating between node weights corresponding to existing nodes within the target area.

In addition, the series of acts 1200 can include an act (e.g., as part of the act 1212) of receiving, from the client device, a request to view the subset of fonts corresponding to the target area of the font map. The series of acts 1200 can further include an act of providing, for display on the client device, a visual depiction of the subset of fonts ordered according to visually similar fonts within the higher-resolution font map.

The series of acts 1200 can include an act of generating, utilizing the self-organizing map, a font map including a set of nodes corresponding to the plurality of fonts by: determining feature distances between the feature vectors and node weights corresponding to the set of nodes, and mapping particular feature vectors representing visually similar fonts to corresponding nodes within the set of nodes based on the feature distances. Mapping feature vectors to nodes of the font map can include comparing the feature vectors to node weights corresponding to the nodes of the font map and identifying, based on comparing the feature vectors to the node weights, a single node of the font map with node weights that correspond to more than one feature vector.

Additionally, the series of acts 1200 can include an act of generating an adaptive-resolution font map including multiple resolutions by the self-organizing map to: identify target areas of the font map corresponding to u-matrix values between nodes that exceed a u-matrix-value threshold, and increase resolutions of the target areas corresponding to u-matrix values that exceed the u-matrix-value threshold by mapping a subset of feature vectors to a subset of nodes within the target areas. Generating the adaptive-resolution font map including multiple resolutions can involve fixing boundary conditions for the target areas of the font map corresponding to u-matrix values that exceed the u-matrix-value threshold and generating new node weights for new nodes within the target areas by interpolating between node weights corresponding to existing nodes within the target area.

The series of acts 1200 can further include an act (e.g., as part of the act 1212) of recommending a font from the plurality of fonts by traversing the font map to sequentially select the font having at least a threshold similarity in relation to a previously selected font. Traversing the font map can involve traversing a path along a gradient of a u-matrix associated with the font map. The series of acts 1200 can also include an act of providing the visual depiction of the one or more fonts by providing a listing of selected fonts resulting from traversal of the font map along the gradient of the u-matrix.

Additionally, the series of acts 1200 can include an act 1200 of tuning the self-organizing map to map sample feature vectors to nodes within the font map by: inputting a sample feature vector representing a sample font into the self-organizing map, determining a best-matching node for the sample feature vector by utilizing the self-organizing map to compare the sample feature vector with initial node weights associated with particular nodes of the self-organizing map by prioritizing nodes with u-matrix values that exceed a u-matrix-value threshold, and modifying node weights of the best-matching node to reduce a difference between the node weights and the sample feature vector.

The series of acts 1200 can include further acts (e.g., as part of the act 1212) of receiving an indication of user selection of a font from within the graphical user interface, in response to the indication of the user selection, generating a higher-resolution font map comprising a subset of fonts for a target area of the font map associated with the selected font, and providing, for display on the client device, a visual depiction of a font from the subset of fonts within the higher-resolution font map.

Further, the series of acts 1200 can include acts (e.g., as part of the act 1212) of receiving an indication of user selection of a font from within the graphical user interface, in response to the indication of the user selection, identifying a subset of fonts within the font map that are within a threshold visual similarity in relation to the selected font, and providing a visual depiction of the subset of fonts for display on the client device. The series of acts 1200 can also include an act of providing a visual depiction of the font map by: comparing a plurality of feature vectors of fonts mapped to a single node of the font map to identify, from among the plurality of feature vectors, a best-matching feature vector having a smallest difference from node weights corresponding to the single node, and generating a visual depiction of a font corresponding to the best-matching feature vector to represent the single node within the visual depiction of the font map.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
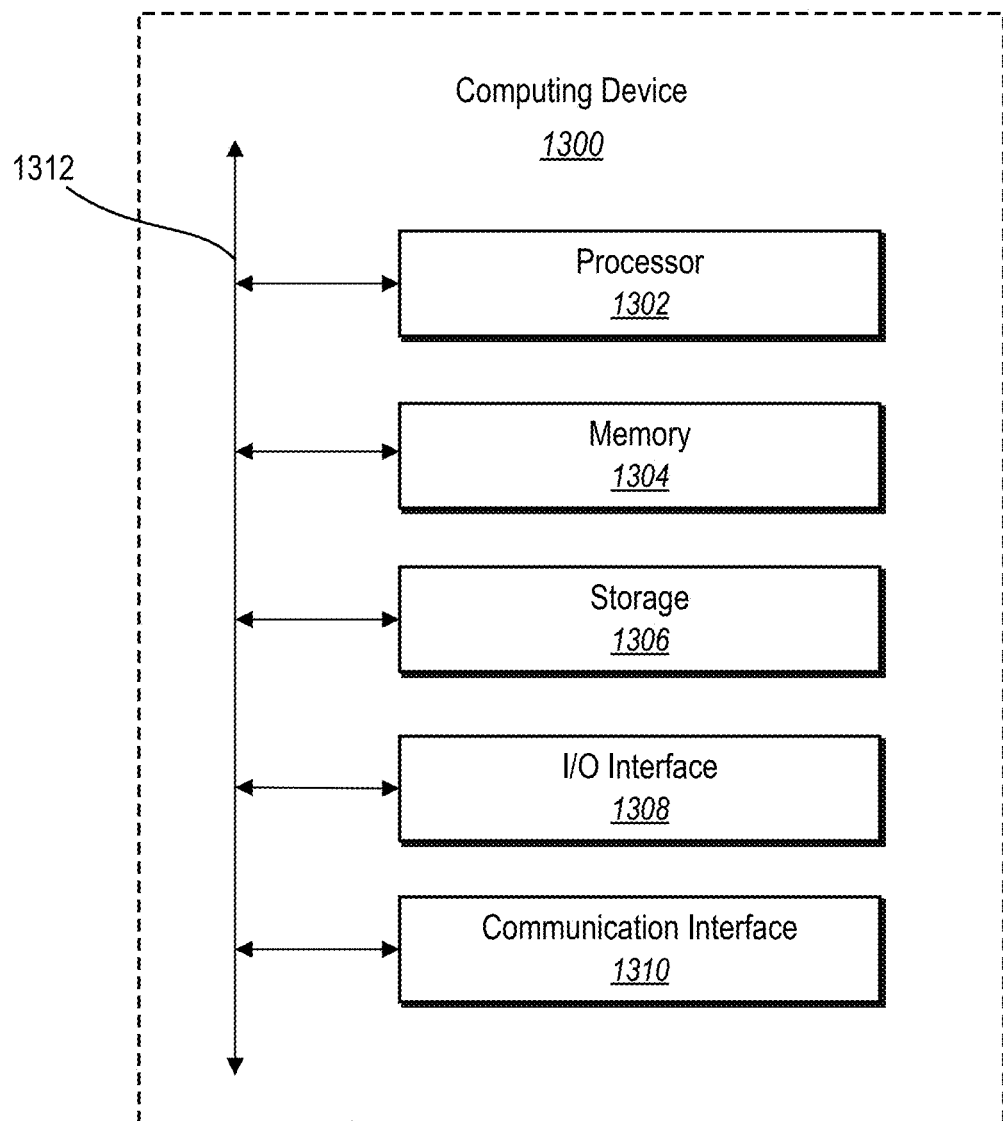
FIG. 13 illustrates a block diagram of an example computing device in accordance with one or more embodiments.

FIG. 13 illustrates, in block diagram form, an example computing device 1300 (e.g., the computing device 1100, the client device 108, and/or the server(s) 104) that may be configured to perform one or more of the processes described above. One will appreciate that the font map system 105 can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing executable instructions that, when executed by a processing device, cause the processing device to perform operations comprising:
    identifying a plurality of fonts of varying styles associated with a client device;
    extracting features from the plurality of fonts;
    determining, utilizing a visual-feature-classification model, visual similarities among the plurality of fonts from the features;
    mapping, utilizing the visual-feature-classification model, the plurality of fonts to a font map according to the visual similarities by arranging visually similar fonts together within common areas of the font map;
    identifying a target area of the font map;
    generating a higher-resolution font map for the target area by mapping a subset of fonts from the plurality of fonts to a subset of nodes of the higher-resolution font map; and
    providing, for display on the client device, a visual depiction of one or more fonts from the subset of fonts based on the higher-resolution font map.

2. The non-transitory computer readable medium of claim 1, wherein extracting the features from the plurality of fonts comprises utilizing an encoder neural network to extract a subset of features from each font from the plurality of fonts.

3. The non-transitory computer readable medium of claim 1, wherein determining the visual similarities among the plurality of fonts comprises determining distances between feature vectors corresponding to the plurality of fonts in a feature space.

4. The non-transitory computer readable medium of claim 1, wherein:
    determining the visual similarities among the plurality of fonts comprises determining feature distances between feature vectors representing the plurality of fonts and node weights for a set of nodes within the font map; and
    mapping the plurality of fonts to the font map according to the visual similarities comprises mapping particular feature vectors representing visually similar fonts to a subset of nodes within the font map.

5. The non-transitory computer readable medium of claim 1, further storing executable instructions that, when executed by the processing device, cause the processing device to perform operations comprising providing, for display on the client device, options for a user to interact with the visual depiction.

6. The non-transitory computer readable medium of claim 1, wherein:
    identifying the target area of the font map comprises identifying areas of the font map corresponding to u-matrix values between nodes that exceed a u-matrix value threshold.

7. The non-transitory computer readable medium of claim 5, wherein generating the higher-resolution font map further comprises:
    fixing a boundary condition for the higher-resolution font map based on a boundary associated with the target area; and
    generating new node weights for new nodes within the target area by interpolating between node weights corresponding to existing nodes within the target area.

8. The non-transitory computer readable medium of claim 5, further storing executable instructions that, when executed by the processing device, cause the processing device to perform operations comprising:
    receiving, from the client device, a request to view the subset of fonts corresponding to the target area of the font map; and
    providing, for display on the client device, a visual depiction of the subset of fonts ordered according to visually similar fonts within the higher-resolution font map.

9. A system comprising:
    one or more memory devices storing a plurality of fonts, an encoder neural network, and a self-organizing map; and
    one or more processors configured to cause the system to perform operations comprising:
        identifying the plurality of fonts of varying styles associated with a client device;
        extracting feature vectors from the plurality of fonts utilizing the encoder neural network;
        determining visual similarities among the plurality of fonts from the feature vectors;
        generating, utilizing the self-organizing map, a font map depicting visually similar fonts together within common areas of the font map, the font map comprising a set of nodes corresponding to the plurality of fonts by:
            determining feature distances between the feature vectors and node weights corresponding to the set of nodes;
            mapping particular feature vectors representing visually similar fonts to corresponding nodes within the set of nodes based on the feature distances;
            identifying a target area of the font map; and
            generating a higher-resolution font map for the target area by mapping a subset of fonts from the plurality of fonts to a subset of nodes of the higher-resolution font map; and
        providing, for display on a client device, a visual depiction of one or more fonts from the subset of fonts based on the higher-resolution font map.

10. The system of claim 9, wherein the one or more processors are further configured to cause the system to perform operations comprising generating an adaptive-resolution font map comprising multiple resolutions by:
- identifying target areas of the font map corresponding to u-matrix values between nodes that exceed a u-matrix-value threshold; and
- increasing resolutions of the target areas corresponding to u-matrix values that exceed the u-matrix-value threshold by mapping a subset of feature vectors to a subset of nodes within the target areas.

11. The system of claim 10, wherein generating the adaptive-resolution font map comprising multiple resolutions comprises:
- fixing boundary conditions for the target areas of the font map corresponding to u-matrix values that exceed the u-matrix-value threshold; and
- generating new node weights for new nodes within the target areas by interpolating between node weights corresponding to existing nodes within the target area.

12. The system of claim 9, wherein the one or more processors are further configured to cause the system to perform operations comprising recommending a font from the plurality of fonts by traversing the font map to select a font having at least a threshold similarity in relation to a previously selected font or another font having less than a threshold difference in visual appearance in relation to a previously selected font.

13. The system of claim 12, wherein traversing the font map comprises traversing a path along a gradient of a u-matrix associated with the font map.

14. The system of claim 13, wherein providing the visual depiction of the one or more fonts comprises providing a listing of selected fonts resulting from traversal of the font map along the gradient of the u-matrix.

15. The system of claim 9, wherein mapping the particular feature vectors to the corresponding nodes of the font map comprises:
- comparing the feature vectors to node weights corresponding to the nodes of the font map; and
- identifying, based on comparing the feature vectors to the node weights, a single node of the font map with node weights that correspond to more than one feature vector.

16. The system of claim 9, wherein the one or more processors are further configured to cause the system to perform operations prising tuning the self-organizing map to map sample feature vectors to nodes within the font map by:
- inputting a sample feature vector representing a sample font into the self-organizing map;
- determining a best-matching node for the sample feature vector by utilizing the self-organizing map to compare the sample feature vector with initial node weights associated with particular nodes of the self-organizing map by prioritizing nodes with u-matrix values that exceed a u-matrix-value threshold; and
- modifying node weights of the best-matching node to reduce a difference between the node weights and the sample feature vector.

17. A computer-implemented method for generating and providing font maps for font selection, the computer-implemented method comprising:
- identifying a plurality of fonts of varying styles associated with a client device;
- extracting features from the plurality of fonts;
- determining, utilizing a visual-feature-classification model, visual similarities among the plurality of fonts from the features;
- mapping, utilizing the visual-feature-classification model, the plurality of fonts to a font map according to the visual similarities by arranging visually similar fonts together within common areas of the font map;
- identifying a target area of the font map;
- generating a higher-resolution font map for the target area by mapping a subset of fonts from the plurality of fonts to a subset of nodes of the higher-resolution font map; and
- providing, for display on the client device, a graphical user interface comprising a visual depiction of one or more fonts from the subset of fonts based on the higher-resolution font map.

18. The computer-implemented method of claim 17, further comprising:
- receiving an indication of user selection of a font from within the graphical user interface;
- in response to the indication of the user selection, generating a higher-resolution font map comprising a subset of fonts for a target area of the font map associated with the selected font; and
- providing, for display on the client device, a visual depiction of a font from the subset of fonts within the higher-resolution font map.

19. The computer-implemented method of claim 17, wherein identifying the plurality of fonts of varying styles associated with the client device comprises identifying a plurality of font faces of varying styles or identifying a plurality of font families of varying styles.

20. The computer-implemented method of claim 17, wherein providing the visual depiction of the one or more fonts for display on the client device comprises providing a visual depiction of the font map by:
- comparing a plurality of feature vectors of fonts mapped to a single node of the font map to identify, from among the plurality of feature vectors, a best-matching feature vector having a smallest difference from node weights corresponding to the single node; and
- generating a visual depiction of a font corresponding to the best-matching feature vector to represent the single node within the visual depiction of the font map.

* * * * *